US011724545B2

(12) United States Patent
Sakurada et al.

(10) Patent No.: US 11,724,545 B2
(45) Date of Patent: Aug. 15, 2023

(54) TIRE COMPRISING A TREAD (71) Applicant: COMPAGNIE GENERALE DES ETABLISSEMENTS MICHELIN, Clermont-Ferrand (FR)

(72) Inventors: Tomoya Sakurada, Tokyo (JP); Tomotake Uchida, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 781 days.

(21) Appl. No.: 16/617,924

(22) PCT Filed: May 31, 2018

(86) PCT No.: PCT/JP2018/020874
§ 371 (c)(1),
(2) Date: Nov. 27, 2019

(87) PCT Pub. No.: WO2018/221630
PCT Pub. Date: Dec. 6, 2018

(65) Prior Publication Data
US 2020/0101795 A1    Apr. 2, 2020

(30) Foreign Application Priority Data
May 31, 2017  (WO) ................. PCT/JP2017/020181

(51) Int. Cl.
B60C 11/00 (2006.01)
B60C 1/00 (2006.01)
C08L 9/06 (2006.01)

(52) U.S. Cl.
CPC ........ B60C 11/0058 (2013.01); B60C 1/0016 (2013.01); B60C 11/0008 (2013.01); C08L 9/06 (2013.01); B60C 2011/0025 (2013.01); C08L 2205/025 (2013.01); C08L 2205/03 (2013.01)

(58) Field of Classification Search
CPC ............... B60C 11/0058; B60C 1/0016; B60C 11/0008; B60C 2011/0025; B60C 11/1346; C08L 9/06; C08L 2205/025; C08L 2205/03
See application file for complete search history.

(56) References Cited

U.S. PATENT DOCUMENTS

| 5,830,930 | A | 11/1998 | Mahmud et al. |
|---|---|---|---|
| 6,013,718 | A | 1/2000 | Cabioch et al. |
| 6,414,061 | B1 | 7/2002 | Cruse et al. |
| 6,774,255 | B1 | 8/2004 | Tardivat et al. |
| 6,849,754 | B2 | 2/2005 | Deschler et al. |
| 7,217,751 | B2 | 5/2007 | Durel et al. |
| 7,250,463 | B2 | 7/2007 | Durel et al. |
| 7,300,970 | B2 | 11/2007 | Durel et al. |
| 7,488,768 | B2 | 2/2009 | Tardivat et al. |
| 7,491,767 | B2 | 2/2009 | Durel et al. |
| 7,987,881 | B2 | 8/2011 | Chassagnon et al. |
| 8,492,475 | B2 | 7/2013 | Araujo da Silva et al. |
| 8,957,155 | B2 | 2/2015 | Seeboth et al. |
| 9,010,393 | B2 | 4/2015 | Araujo da Silva et al. |
| 9,175,124 | B2 | 11/2015 | Chaboche et al. |
| 9,962,996 | B2 | 5/2018 | Abad et al. |
| 2004/0051210 | A1 | 3/2004 | Tardivat et al. |
| 2004/0129360 | A1 | 7/2004 | Vidal |
| 2004/0132880 | A1 | 7/2004 | Durel et al. |
| 2005/0004297 | A1 | 1/2005 | Durel et al. |
| 2005/0016650 | A1 | 1/2005 | Durel et al. |
| 2005/0016651 | A1 | 1/2005 | Durel et al. |
| 2005/0109436 | A1 | 5/2005 | Bruant et al. |
| 2005/0245753 | A1 | 11/2005 | Cruse et al. |
| 2007/0062623 | A1 | 3/2007 | Chassagnon et al. |
| 2007/0228322 | A1 | 10/2007 | Chaves et al. |
| 2008/0041508 | A1 | 2/2008 | Cambon et al. |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2010/0145089 | A1 | 6/2010 | Mignani et al. |
| 2011/0094647 | A1 | 4/2011 | Pruitt |
| 2011/0152458 | A1 | 6/2011 | Araujo da Silva et al. |
| 2011/0178233 | A1 | 7/2011 | Chaboche et al. |
| 2011/0294953 | A1 | 12/2011 | Seeboth et al. |
| 2013/0267640 | A1 | 10/2013 | Lopez et al. |
| 2014/0311641 | A1 | 10/2014 | El-Harak et al. |
| 2014/0326378 | A1 | 11/2014 | Abad et al. |
| 2015/0034223 | A1 | 2/2015 | Kaneko |
| 2015/0239296 | A1 | 8/2015 | Fukuda |
| 2017/0204256 | A1 | 7/2017 | Labrunie et al. |
| 2018/0312003 | A1 | 11/2018 | Winston et al. |

FOREIGN PATENT DOCUMENTS

| EP | 0 510 550 A1 | 10/1992 |
|---|---|---|
| EP | 0 778 311 A1 | 6/1997 |
| EP | 2 285 852 | 11/2009 |
| JP | 61-263807 A | 11/1986 |
| JP | 7-81326 A | 3/1995 |

(Continued)

OTHER PUBLICATIONS

International Search Report dated Jul. 19, 2018, in corresponding PCT/JP2018/020874 (3 pages).

(Continued)

Primary Examiner — Angela C Scott
(74) Attorney, Agent, or Firm — Venable LLP (57) ABSTRACT A tire having a tread comprising at least two radially superposed portions which comprise a radially external portion being made of a first rubber composition (FC), and a radially internal portion being made of a second rubber composition (SC); the tread comprising a plurality of tread pattern elements (1) delimited by cut-outs (3, 4); the tread pattern elements (1) respectively comprising at least one lateral face (13, 14, 15, 16) and a contact surface (2) intended to come into contact with the ground during rolling; the external portion of the tread pattern elements (1) being at least partially covered on at least one of the lateral face(s) (13, 14, 15, 16) with a layer of a third rubber composition (TC).

20 Claims, 2 Drawing Sheets (56) References Cited

FOREIGN PATENT DOCUMENTS

| | | |
|---|---|---|
| JP | 11-78414 A | 3/1999 |
| JP | 2007-320354 A | 12/2007 |
| WO | 96/37547 A2 | 11/1996 |
| WO | 97/36724 A2 | 10/1997 |
| WO | 99/09036 A1 | 2/1999 |
| WO | 99/16600 A1 | 4/1999 |
| WO | 99/28380 A1 | 6/1999 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/016387 A1 | 2/2003 |
| WO | 2004/033548 A1 | 4/2004 |
| WO | 2005/044593 A1 | 5/2005 |
| WO | 2006/023815 A2 | 3/2006 |
| WO | 2006/125532 A1 | 11/2006 |
| WO | 2006/125533 A1 | 11/2006 |
| WO | 2006/125534 A1 | 11/2006 |
| WO | 2007/098080 A2 | 8/2007 |
| WO | 2008/055986 A2 | 5/2008 |
| WO | 2010/072685 A1 | 7/2010 |
| WO | 2012/069565 A1 | 5/2012 |
| WO | 2013/087878 A1 | 6/2013 |
| WO | 2015/185394 A1 | 12/2015 |
| WO | 2016/098908 A1 | 6/2016 |
| WO | 2016/195050 A1 | 12/2016 |
| WO | 2017/075490 A1 | 5/2017 |

OTHER PUBLICATIONS

International Search Report and Written Opinion dated Aug. 8, 2017, in corresponding PCT/JP2017/020181 (10 pages).
S. Brunauer, et al., "Adsorption of Gases in Multimolecular Layers", J. Am. Chem. Soc., vol. 60, pp. 309-319 (1938).
S. Ella, et al., "Investigation of rubber friction on snow for tyres", 38th LEEDS-Lyons Symposium on Tribology (2011).

Cross section II-II

TIRE COMPRISING A TREAD

TECHNICAL FIELD

The field of the invention is that of rubber compositions for tire treads, more precisely rubber compositions for tire treads suitable for snow tires or winter tires capable of rolling over ground surfaces covered with snow.

BACKGROUND ART

As is known, the snow tires classified in a category of use "snow", identified by an inscription the alpine symbol ("3-peak-mountain with snowflake"), marked on their sidewalls, mean tires whose tread patterns, tread compounds and/or structures are primarily designed to achieve, in snow conditions, a performance better than that of normal tires intended for normal on-road use with regard to their abilities to initiate, maintain or stop vehicle motion.

CITATION LIST

Patent Literature

PTL 1: WO 2012/069565
PTL 2: WO2013/087878

The patent literature 1 discloses a tire tread that comprises a rubber composition based on a functional diene elastomer, a reinforcing inorganic filler and a plasticizing agent, said tire having an improved grip on snowy ground.

The patent literature 2 discloses a tire and the tread pattern elements respectively comprising at least one lateral face and a contact surface intended to come into contact with the ground during rolling, wherein the tread pattern elements comprise a base rubber composition at least partially covered on at least one of the lateral face(s) with a layer of a covering composition which is different from the base rubber composition and which comprises a specific formulation able to give such very rigid covering layer after vulcanization of the tire, and these tread pattern elements placed are favorable the grip on snowy ground.

Snowy ground has a feature of having a low friction coefficient and a constant objective of tire manufacturers is improvement of a grip performance of tires on snow-covered (snowy) ground.

SUMMARY OF INVENTION

Technical Problem

During their research, the inventors have discovered that a specific tread composite structure with at least three different compositions on external, internal and covering portions (on lateral faces of tread pattern elements) allows unexpectedly improved the grip performance of the tire on snowy ground.

In the present description, unless expressly stated otherwise, all the percentages (%) indicated are percentages by weight (wt %).

The expression "elastomer matrix" is understood to mean, in a given composition, all of the elastomers present in said rubber composition.

The abbreviation "phr" signifies parts by weight per hundred parts by weight of the elastomer matrix in the considered rubber composition.

In the present description, unless expressly indicated otherwise, each $Tg_{DSC}$ (glass transition temperature) is measured in a known way by DSC (Differential Scanning Calorimetry) according to Standard ASTM D3418-08.

Any interval of values denoted by the expression "between a and b" represents the range of values of greater than "a" and of less than "b" (i.e. the limits a and b excluded) whereas any interval of values denoted by the expression "from a to b" means the range of values going from "a" to "b" (i.e. including the strict limits a and b).

The expression "based on" should be understood in the present application to mean a composition comprising the mixture(s) and/or the product of the reaction of the various constituents used, some of the constituents being able or intended to react together, at least partly, during the various manufacturing phases of the composition, in particular during the vulcanization (curing).

As a tire has a geometry of revolution about an axis of rotation, the geometry of the tire is generally described in a meridian plane containing the axis of rotation of the tire, and the following definitions of directions of the tire are understood in the present application:

A radial direction is a direction perpendicular to the axis of rotation of the tire;

An axial direction is a direction parallel to the axis of rotation of the tire;

A circumferential direction is a direction perpendicular to the meridian plane.

A plane being perpendicular to the axis of rotation of the tire and passing through the middle of a tread surface of the tire is referred to as an equatorial plane of the tire.

In what follows, expressions "radially", "axially" and "circumferentially" respectively mean "in the radial direction", "in the axial direction" and "in the circumferential direction". Expressions "radially on the inside (radially inner or radially internal), or respectively radially on the outside (radially outer or radially external)" mean "closer or, respectively, further away, from the axis of rotation of the tire, in the radial direction, than". Expressions "axially on the inside (axially inner or axially interior) or respectively axially on the outside (axially outer or axially exterior)" mean "closer or, respectively further away, from the equatorial plane, in the axial direction, than". Respective dimensions of a given element in the radial, axial and circumferential directions will also be denoted "radial thickness or height", "axial width" and "circumferential length" of this element. Expression "laterally" means "in the circumferential or axial direction".

Solution to Problem

A first aspect of the invention is a tire having a tread comprising at least two radially superposed portions which comprise a radially external portion being made of a first rubber composition (FC), and a radially internal portion made of a second rubber composition (SC) which is different from the first rubber composition (FC); the tread comprising a plurality of tread pattern elements (1) delimited by cut-outs (3, 4); the tread pattern elements (1) respectively comprising at least one lateral face (13, 14, 15, 16) and a contact surface (2) intended to come into contact with the ground during rolling; the external portion of the tread pattern elements (1) being at least partially covered on at least one of the lateral face(s) (13, 14, 15, 16) with a layer of a third rubber composition (TC) which is different from the first rubber composition (FC) and the second rubber composition (SC); wherein the first rubber composition (FC) is based on at least an elastomer matrix, a reinforcing filler, and a plasticizing agent; wherein the second rubber composition (SC) is based on at least an elastomer matrix, a reinforcing filler, and a plasticizing agent comprising 5 to 100 phr of a liquid plasticizer(s) exhibiting a glass transition temperature(s) ($Tg_{DSC}$) of less than −70° C.; wherein the third rubber composition (TC) is based on at least an elastomer matrix, a reinforcing filler; and a plasticizing agent comprising 5 to 100 phr of a hydrocarbon resin(s) exhibiting a glass transition temperature(s) ($Tg_{DSC}$) of more than 20° C.

A second aspect of the invention is the tire according to the first aspect, wherein the first rubber composition (FC) is based on the elastomer matrix comprising more than 50 phr and up to 100 phr of a first diene elastomer(s) selected from the group consisting of natural rubber, synthetic polyisoprenes, polybutadienes, butadiene copolymers, isoprene copolymers and the mixtures thereof, and comprising no second diene elastomer or less than 50 phr of a second diene elastomer(s) which is different from the first diene elastomer(s), between 50 and 200 phr of the reinforcing filler, and more than 30 phr of the plasticizing agent.

A third aspect of the invention is the tire according to the first or the second aspect, wherein the second rubber composition (SC) is such that the elastomer matrix comprises more than 50 phr and up to 100 phr of a first diene elastomer(s) exhibiting a glass transition temperature(s) ($Tg_{DSC}$) of less than −40° C., and comprises no second diene elastomer or less than 50 phr of a second diene elastomer(s) which is the different from the first diene elastomer(s).

A fourth aspect of the invention is the tire according to the first or the second aspect, wherein the second rubber composition (SC) is such that the elastomer matrix comprises 20 to 100 phr of a first diene elastomer(s) bearing at least one SiOR function, R being a hydrogen atom or a hydrocarbon radical, and comprises no second dine elastomer or comprises at most 80 phr of a second diene elastomer(s) which is different from the first diene elastomer(s).

A fifth aspect of the invention is the tire according to the fourth aspect, wherein the second rubber composition (SC) is such that the first diene elastomer(s) is a styrene-butadiene copolymer(s).

A sixth aspect of the invention is the tire according to the fourth or the fifth aspect, wherein the second rubber composition (SC) is such that the SiOR function is located at the chain end of the first diene elastomer(s).

A seventh aspect of the invention is the tire according to the fourth or the fifth aspect, wherein the second rubber composition (SC) is such that the SiOR function is not located at the chain end of the first diene elastomer(s).

An eighth aspect of the invention is the tire according to any one of the fourth to the seventh aspects, wherein the second rubber composition (SC) is such that the first diene elastomer(s) further bears at least one amine function.

A ninth aspect of the invention is the tire according to the eighth aspect, wherein the second rubber composition (SC) is such that the SiOR function bears the amine function.

A tenth aspect of the invention is the tire according to any one of the fourth to the ninth aspects, wherein the second rubber composition (SC) is such that R of the SiOR function is a hydrogen atom.

An eleventh aspect of the invention is the tire according to any one of the fourth to the ninth aspects, wherein the second rubber composition (SC) is such that R of the SiOR function is a hydrocarbon radical.

A twelfth aspect of the invention is the tire according to any one of the fourth to the eleventh aspects, wherein the second rubber composition (SC) is such that the first diene elastomer(s) exhibits a glass transition temperature(s) ($Tg_{DSC}$) of less than −40° C.

A thirteenth aspect of the invention is the tire according to any one of the fourth to the twelfth aspects, wherein the second rubber composition (SC) is such that the elastomer matrix comprises 40 to 100 phr of the first diene elastomer(s), and comprises no second diene elastomer or comprises at most 60 phr of the second diene elastomer(s).

A fourteenth aspect of the invention is the tire according to the thirteenth aspect, wherein the second rubber composition (SC) is such that the elastomer matrix comprises 60 to 80 phr of the first diene elastomer(s), and 20 to 40 phr of the second diene elastomer(s).

A fifteenth aspect of the invention is the tire according to any one of the fourth to the fourteenth aspects, wherein the second rubber composition (SC) is such that the second diene elastomer(s) is selected from the group consisting of natural rubber, synthetic polyisoprenes, polybutadienes, butadiene copolymers, isoprene copolymers, and the mixtures thereof.

A sixteenth aspect of the invention is the tire according to the fifteenth aspect, wherein the second rubber composition (SC) is such that the second diene elastomer(s) is a polybutadiene(s).

A seventeenth aspect of the invention is the tire according to any one of the first to sixteenth aspects, wherein the second rubber composition (SC) is such that the reinforcing filler comprises 20 to 200 phr of a reinforcing inorganic filler.

An eighteenth aspect of the invention is the tire according to any one of the first to seventeenth aspects, wherein the second rubber composition (SC) is such that the reinforcing filler further comprises less than 40 phr of carbon black.

A nineteenth aspect of the invention is the tire according to any one of the first to the eighteenth aspects, wherein the second rubber composition (SC) is such that the plasticizing agent comprises 10 to 90 phr of the liquid plasticizer(s) exhibiting the glass transition temperature(s) ($Tg_{DSC}$) of less than −70° C.

A twentieth aspect of the invention is the tire according to any one of the first to the nineteenth aspects, wherein the second rubber composition (SC) is such that the liquid plasticizer(s) exhibits the glass transition temperature(s) ($Tg_{DSC}$) of less than −80° C., preferably less than −90° C., preferably less than −100° C.

A twenty first aspect of the invention is the tire according to any one of the first to the twentieth aspects, wherein the second rubber composition (SC) is such that the liquid plasticizer the glass transition temperature(s) ($Tg_{DSC}$) of less than −70° C., preferably less than −80° C., more preferably −90° C., still more preferably −100° C., is selected from the group consisting of liquid phosphate plasticizer(s) and the mixtures thereof.

A twenty second aspect of the invention is the tire according to the twenty first aspect, wherein the second rubber composition (SC) is such that the liquid phosphate plasticizer(s) has between 12 and 30 carbon atoms in total.

A twenty third aspect of the invention is the tire according to the twenty second aspect, wherein the second rubber composition (SC) is such that the liquid phosphate plasticizer(s) is tris(2-ethylhexyl) phosphate.

A twenty fourth aspect of the invention is the tire according to any one of the twenty first to the twenty third aspects, wherein the second rubber composition (SC) is such that the plasticizing agent comprises no liquid plasticizer other than the liquid phosphate plasticizer or comprises at most 50 phr of a liquid plasticizer(s) other than the liquid phosphate plasticizer(s).

A twenty fifth aspect of the invention is the tire according to the twenty fourth aspect, wherein the second rubber composition (SC) is such that the liquid plasticizer(s) other than the liquid phosphate plasticizer(s) are selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers other than phosphate plasticizers, sulphonate plasticizers and the mixtures thereof.

A twenty sixth aspect of the invention is the tire according to any one of the first to the twenty fifth aspects, wherein the third rubber composition (TC) is such that the elastomer matrix comprises more than 50 phr and up to 100 phr of a first diene elastomer(s) exhibiting a glass transition temperature(s) ($Tg_{DSC}$) of more than $-40°$ C., and comprises no second diene elastomer or comprises less than 50 phr of a second diene elastomer(s) which is different from the first diene elastomer(s).

A twenty seventh aspect of the invention is the tire according to the twenty sixth aspect, wherein the third rubber composition (TC) is such the first diene elastomer(s) is selected from the group consisting of natural rubber, synthetic polyisoprenes, polybutadienes, butadiene copolymer, isoprene copolymers, and the mixtures thereof.

A twenty eighth aspect of the invention is the tire according to the twenty seventh aspect, wherein the third rubber composition (TC) is such that that the first diene elastomer(s) is a styrene-butadiene copolymer(s).

A twenty ninth aspect of the invention is the tire according to the first to the twenty eighth aspects, wherein the third rubber composition (TC) is such that the reinforcing filler comprises more than 60 phr of a reinforcing inorganic filler.

A thirtieth aspect of the invention is the tire according to the first to the twenty ninth aspects, wherein the third rubber composition (TC) is such that the plasticizing agent comprises 10 to 90 phr of the hydrocarbon resin(s) exhibiting the glass transition temperature(s) ($Tg_{DSC}$) of more than $20°$ C.

A thirty first aspect of the invention is the tire according to the first to the thirtieth aspects, wherein the third rubber composition (TC) is such that the hydrocarbon resin(s) exhibits the glass transition temperature(s) of more than $30°$ C., preferably more than $40°$ C., more preferably more than $45°$ C., still more preferably at least $50°$ C.

A thirty second aspect of the invention is the tire according to the first to the thirty first aspects, wherein the third rubber composition (TC) is such that the hydrocarbon resin(s) the glass transition temperature(s) of more than $20°$ C., preferably more than $30°$ C., more preferably more than $40°$ C., still more preferably more than $45°$ C., particularly at least $50°$ C., are selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof.

A thirty third aspect of the invention is the tire according to any one of the first to the thirty second aspects, wherein the glass transition temperature of the first rubber composition (FC) on the maximum tan δ when subjected to an alternating maximum stress of 0.70 MPa at a frequency of 10 Hz is higher than that of the second rubber composition (SC), and is lower than that of the third rubber composition (TC).

A thirty fourth aspect of the invention is the tire according to the thirty third aspect, wherein the glass transition temperature of the second rubber composition (SC) on the maximum tan δ when subjected to an alternating maximum stress of 0.70 MPa at a frequency of 10 Hz is less than $-40°$ C.

A thirty fifth aspect of the invention is the tire according to any one of the first to the thirty fourth aspects, wherein the dynamic share modulus G* of the first rubber composition (FC) when subjected to the alternating maximum stress of 0.25 MPa at the frequency of 10 Hz and a temperature of $-10°$ C. is higher than that of the second rubber composition (SC), and is lower that of the third rubber composition (TC).

A thirty sixth aspect of the invention is the tire according to the thirty fifth aspect, wherein the difference of dynamic share modulus G* between the first rubber composition (FC) and the second rubber composition (SC) when subjected to an alternating maximum stress of 0.25 MPa at a frequency of 10 Hz and a temperature of $-10°$ C. is at least 1.0 MPa.

A thirty seventh aspect of the invention is the tire according to the thirty sixth aspect, wherein the dynamic share modulus G* of the first rubber composition (FC) when subjected to the alternating maximum stress of 0.25 MPa at the frequency of 10 Hz and a temperature of $-10°$ C. is at least 3.0 MPa.

A thirty eighth aspect of the invention is the tire according to any one of the first to thirty seventh aspects, wherein the dynamic share modulus G* of the third rubber composition (TC) when subjected to the alternating maximum stress of 0.25 MPa at the frequency of 10 Hz and a temperature of $-10°$ C. is more than 100 MPa.

A thirty ninth aspect of the invention is the tire according to any one of the first to the thirty eight aspects, wherein the tire is a snow tire.

The tires of the invention are particularly intended to equip passenger motor vehicles, including 4×4 (four-wheel drive) vehicles and SUV (Sport Utility Vehicles) vehicles, and industrial vehicles particularly selected from vans and heavy duty vehicles (i.e., bus or heavy road transport vehicles (lorries, tractors, trailers)).

Advantageous Effects of Invention

The specific tread composite structure with the external portion made of the first rubber composition (FC), the internal portion made of second rubber composition (SC), and the covering portion made of the third rubber composition (TC) allows unexpectedly improved the grip performance of the tire on snowy ground.

Each of the below aspect(s), the embodiment(s), the instantiation(s), and the variant(s) including each of the preferred range(s) and/or matter(s) may be applied to any one of the other aspect(s), the other embodiment(s), the other instantiation(s) and the other variant(s) of the invention unless expressly stated otherwise.

BRIEF DESCRIPTION OF DRAWINGS

Other characteristics and advantages of the invention arise from the description made hereafter in reference to the annexed drawings which schematically show (in particular not to a specific scale), as nonrestrictive examples, of the embodiments of the object of the invention.

In these drawings.

DESCRIPTION OF EMBODIMENTS

Figure 1:
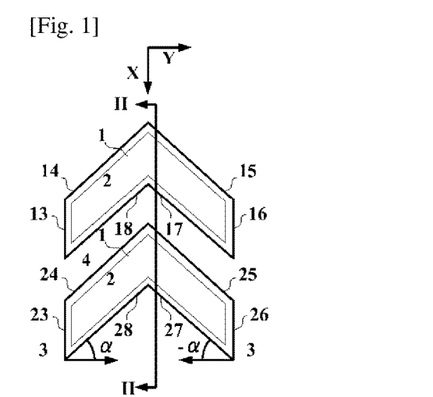
FIG. 1 depicts a partial plan view of blocks as tread pattern elements (1) of a tread of a tire according to the invention.

The annexed FIG. 1 represents a partial plan view of two chevron shape blocks as a plurality of tread pattern elements (1) of a tread of a tire according to the invention. X is a circumferential direction of the tire, Y is an axial direction of the tire, and the line of section II-II is parallel to the circumferential direction. Each of the blocks is delimited by cut-outs (3, 4). The cut-outs (3, 4) are grooves (3) circumferentially extending and the other grooves (4) extending along an angle(s) (±α) from the axial direction. Each of the blocks comprises six lateral faces (13, 14, 15, 16, 17, 18) and a contact surface (2) intended to come into contact with ground during the tire rolling. Intersections of the lateral faces (13, 14, 15, 16, 17, 18) with the contact surface (2) form edge corners (23, 24, 25, 26, 27, 28) which play important portions when driving on snowy ground.

Figure 2:
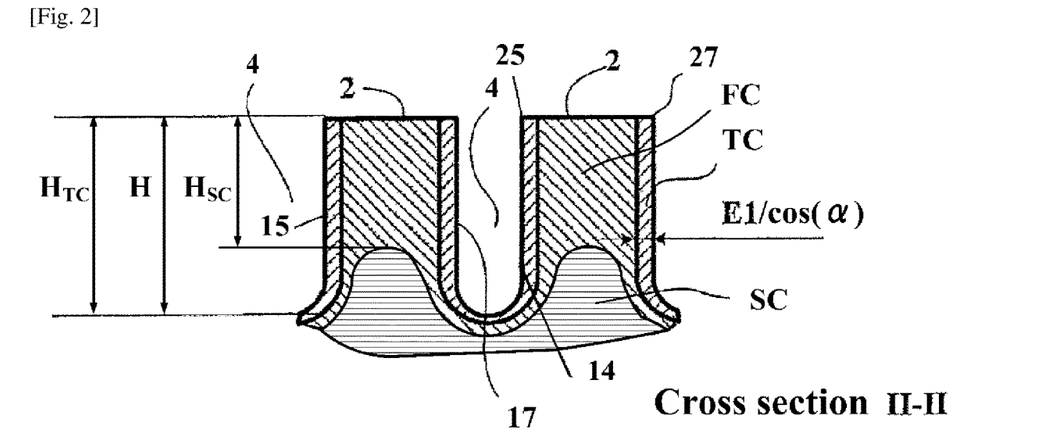
FIG. 2 shows the blocks of FIG. 1 in the cross section on the line of section II-II in a case.

As shown in the annexed FIG. 2, each of the blocks comprises two radially superposed portions which comprise a radially external portion, the radially being made of a first rubber composition (FC), a radially internal portion adjacent to the radially external portion, the radially internal portion in made of a second rubber composition (SC) which is different from the first rubber composition (FC), and a layer covering the first rubber composition (FC) on the lateral faces (13, 14, 15, 16, 17, 18) bounding the grooves (3, 4) extending in the circumferential direction (3) or along the angle(s) (±α) from the axial direction (4), the layer made of a third rubber composition (TC) which is different from the first rubber composition (FC) and the second rubber composition (SC). In this case, the radially outermost of the internal portion made of the second rubber composition (SC) is outward present from the radially innermost of the cut-outs (3, 4) in the tread pattern elements (1), which means that a height ($H_{SC}$) from the radially outermost of the internal portion made of the second rubber composition (SC) to the contact surface (2) is shorter than a height (H) which is equal to the radially innermost depth in the cut-outs (3, 4). The layer of the third rubber composition (TC) has a thickness (E1) in a direction perpendicular to the lateral face(s) (13, 14, 15, 16, 17, 18), and the thickness (E1) is substantially constant (over an entire height ($H_{TC}$) of covering, in this instance, equal to the depth (H) which is equal to the radially innermost depth in the cut-outs (3, 4)).

According to another embodiment of the invention, the radically outermost of the internal portion made of the second rubber composition (SC) may be inward present from radially innermost of the cut-outs (3, 4) in the tread pattern elements (1).

According to a preferred embodiment of the invention, the third rubber composition (TC) may extend, in a new condition of the tire, as far as the edge corners (23, 24, 25, 26, 27, 28) formed by a boundary between the contact surface (2) and the lateral faces (13, 14, 15, 16, 17, 18) of the tread pattern elements (1).

According to a preferred embodiment of the invention, the layer of the third rubber composition (TC) may cover on the lateral faces (14, 15, 17, 18) extending along the angle(s) (±α) from the axial direction in order to efficiently improve a grip on snowy ground.

According to a preferred embodiment of the invention, the thickness (E1) may be greater than 0.1 mm, preferably greater than 0.2 mm, more preferably between 0.2 mm and 4.0 mm. For the tires intended to be equipped to passenger motor vehicles, E1 is particularly between 0.3 mm and 1.0 mm.

Each of the rubber compositions, which are the first rubber composition (FC), the second rubber composition (SC) and the third rubber composition (TC), of the tread of the tire according to the invention is based on each elastomer matrix.

Elastomer (or loosely "rubber", the two terms being regarded as synonyms) of the "diene" type is to be understood in a known manner as an (meaning one or more) elastomer derived at least partly (i.e. a homopolymer or a copolymer) from diene monomers (monomers bearing two carbon-carbon double bonds, conjugated or not).

These diene elastomers can be classified into two categories: "essentially un-saturated" or "essentially saturated". Generally, the expression "essentially un-saturated" is understood to mean a diene elastomer resulting at least in part from conjugated diene monomers having a content of units of diene origin (conjugated dienes) which is greater than 15% (mol %); thus it is that diene elastomers such as butyl rubbers or diene/a –olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Although it applies to any type of diene elastomer, a person skilled in the art of tires will understand that the invention is preferably employed with essentially unsaturated diene elastomers.

Given these definitions, the expression diene elastomer capable of being used in the compositions in accordance with the invention is understood in particular to mean:

(a)—any homopolymer obtained by polymerization of a conjugated diene monomer, preferably having from 4 to 12 carbon atoms;

(b)—any copolymer obtained by copolymerization of one or more conjugated dienes with one another or with one or more vinyl aromatic compounds preferably having from 8 to 20 carbon atoms.

The following are suitable in particular as conjugated dienes: 1,3-butadiene, 2-methyl-1,3-butadiene, 2,3-di($C_1$-$0_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the"vinyltoluene" commercial mixture, para-(tert-butyl) styrene, methoxy styrenes, chlorostyrenes, vinylmesitylene, di-vinylbenzene or vinylnaphthalene.

According to a preferred embodiment of the invention, in the first rubber composition (FC), the second rubber composition (SC) and/or the third rubber composition (TC), preferably "at least in the first rubber composition (FC)" or "at least in the third rubber composition (TC)", more preferably "at least in the first rubber composition (FC) and the second rubber composition (SC)", "at least in the first rubber composition (FC) and the third rubber composition (TC)", or "at least in the second rubber composition (SC) and the third rubber composition (TC)", still more preferably in the first rubber composition (FC), the second rubber composition (SC) and the third rubber composition (TC), the elastomer matrix may comprise more than 50 phr and up to 100 phr, preferably 60 to 100 phr, more preferably 70 to 100 phr, still more preferably 80 to 100 phr, particularly 90 to 100 phr, more particularly 100 phr, of a first diene elastomer(s), and may comprise no second diene elastomer or less than 50 phr, preferably at most 40 phr, more preferably at most 30 phr, still more preferably at most 20 phr, particularly at most 10 phr, of a second diene elastomer(s) which is different from the first diene elastomer(s).

According to a preferred instantiation of the embodiment, in the first rubber composition (FC) and/or the second rubber composition (SC), preferably in the first rubber composition (FC) and the second rubber composition (SC), the first diene elastomer(s) may exhibit a glass transition temperature(s) ($Tg_{DSC}$) of less than −40° C. (for example, between −120° C. and −40° C.), preferably less than −45° C. (for example, between −115° C. and −45° C.).

According to a preferred instantiation of the embodiment, in the third rubber composition (TC), the first diene elastomer(s) may exhibit a glass transition temperature(s) ($Tg_{DSC}$) of more than −40° C. (for example between −40° C. and +40° C.), preferably more than −35° C. (for example between −35 and +35° C.), more preferably more than −30° C. (for example between −30 and +30° C.), still more preferably at least −25° C. (for example −25° C. to +25° C.).

According to a preferred instantiation of the embodiment, the first diene elastomer(s) may be selected from the group consisting of polybutadienes (BRs), synthetic poly-isoprenes (IRs), natural rubber (NR), butadiene copolymers, isoprene copolymers and the mixtures thereof, preferably selected from selected from the group consisting of polybutadienes, butadiene copolymers, and the mixtures thereof. Such copolymers may be selected more preferably from the group consisting of styrene butadiene copolymers (SBRs) and the mixtures thereof, still more preferably from the group consisting of solution styrene butadiene copolymers and the mixtures thereof.

According to a preferred instantiation of the instantiation, in the third rubber composition (TC), the first diene elastomer(s) may be a styrene-butadiene copolymer(s), preferably a solution styrene-butadiene copolymer(s) which is a copolymer(s) of butadiene and styrene, prepared in solution.

According to a preferred embodiment of the invention, in the first rubber composition (FC), the second rubber composition (SC) and/or the third rubber composition (TC), preferably at least in the second rubber composition (SC), more preferably "at least in the first rubber composition (FC) and the second rubber composition (SC)" or "at least in the second rubber composition (SC) and the third rubber composition (TC)", still more preferably in the first rubber composition (FC), the second rubber composition (SC) and the third rubber composition (TC), the elastomer matrix may comprise a first diene elastomer(s) bearing at least one SiOR function, R being a hydrogen atom or a hydrocarbon radical, and may comprise no second dine elastomer or may comprise a second diene elastomer(s) which is different from the first diene elastomer(s).

According to a preferred instantiation of the embodiment, the first diene elastomer(s) may be selected from the group consisting of polybutadienes (BRs), synthetic poly-isoprenes (IRs), natural rubber (NR), butadiene copolymers, isoprene copolymers and the mixtures thereof; such copolymers are selected more preferably from the group consisting of styrene butadiene copolymers (SBRs) and the mixtures thereof, still more preferably from the group consisting of solution styrene butadiene copolymers and the mixtures thereof.

According to a preferred instantiation of the instantiation, the first diene elastomer(s) may be a styrene-butadiene copolymer, preferably a solution styrene-butadiene copolymer.

According to a preferred instantiation of the embodiment, the first diene elastomer(s) may have any microstructure which depends on the polymerization conditions used, in particular on the presence or absence of a modifying and/or randomizing agent and on the amounts of modifying and/or randomizing agent employed. This elastomer may, for example, be a block, statistical, sequential or micro sequential elastomer and may be prepared in dispersion or in solution.

Generally, a function borne by an elastomer, particularly a diene elastomer, may be located on the elastomer chain end(s) or may not be located at the elastomer chain ends, that is, may be away from the chain ends. The first case occurs for example when the diene elastomer is prepared using a polymerization initiator bearing the function or using a functionalizing agent. The second case occurs for example when the diene elastomer is modified by the use of a coupling agent or star-branching agent bearing the function.

The expression "hydrocarbon radical" means a monovalent group essentially consisting of carbon and hydrogen atoms. Such a group may comprise at least one heteroatom, and it is known that the assembly formed by the carbon and hydrogen atoms represents the major number fraction in the hydrocarbon radical, for example alkyl or alkoxyalkyl; preferably assembly formed by the carbon and hydrogen atoms represents the entirety of the hydrocarbon radical(s), for example alkyl. Such a SiOR (R is alkyl or alkoxyalkyl) is referred as an "alkoxysilane" function. While, a SiOH (R is a hydrogen atom) is referred as a "silanol" function.

According to a preferred instantiation of the embodiment, the SiOR function may be located at the chain end of the first diene elastomer(s). In the instantiation, the first diene elastomer(s) bearing the SiOR function located at the chain end may be prepared according to the procedure described in a patent EP 0 778 311 B 1, for example by reaction of the carbanion at the end of the living elastomeric chain with hexamethylcyclotrisiloxane followed by reaction with a proton donor.

According to a preferred instantiation of the embodiment, the SiOR function may not be located at the chain end of the first diene elastomer(s).

According to a first variant of the instantiation, the SiOR function borne by the first diene elastomer(s) may be a pendant group, which is equivalent to saying that the silicon atom of the SiOR function may not be inserted between the carbon-carbon bonds of the elastomer chain of the first diene elastomer(s). A diene elastomer bearing a pendant SiOR function may for example be prepared by hydrosilylation of the elastomer chain by a silane bearing an alkoxysilane group, followed by hydrolysis of the alkoxysilane function to give a SiOR function.

According to a second variant of the instantiation, the SiOR function borne by the first diene elastomer(s) may not be a pendant group, but may be situated in the elastomer chain, that is, may be within the elastomer chain, which is equivalent to saying that the silicon atom of the SiOR function may be inserted between the carbon-carbon bonds of the elastomer chain of the first diene elastomer(s). Such a diene elastomer may be prepared according to the procedure described in a patent EP 2 285 852 B1. This second variant is preferential and applies to the instantiation.

According to a preferred instantiation of the embodiment, the first diene elastomer(s) may further bear at least one amine function, preferably at least one tertiary amine function.

Mention will be made, as tertiary amine function, of the amines substituted with $C_1$-$C_{10}$ alkyl radicals, preferably $C_1$-$C_4$ alkyl, more preferably methyl or ethyl radical(s).

Preferably, the amine function borne by the first diene elastomer(s) may be a pendant group. The pendant position of the amine function means, in a known way, that the nitrogen atom of the amine function may not be inserted between the carbon-carbon bonds of the elastomer chain of the first diene elastomer(s).

According to a preferred instantiation of the instantiation, the SiOR function may bear the amine function.

Such a diene elastomer may result from the modification of a diene elastomer by a coupling agent that introduces, the elastomer chain, an alkoxysilane group bearing an amine function according to the operating procedure described in a patent EP 2 285 852 B 1. The following are suitable for example as coupling agent: N,N-dialkylaminopropyltrialkoxysilanes, $C_1$-$C_{10}$, preferably $C_1$-$C_4$, dialkyl groups, the compounds 3-(N,N-dimethylaminopropyl)trimethoxysilane, 3-(N,N-dimethylaminopropyl)triethoxysilane, 3-(N,N-diethylaminopropyl)trimethoxysilane, 3-(N,N-diethylaminopropyl)triethoxysilane being most particularly preferred, irrespective of the embodiment(s)/instantiation(s)/variant(s) of the invention.

According to a preferred instantiation of the embodiment, R of the SiOR function is a hydrogen atom.

According to a preferred instantiation of the embodiment, R of the SiOR function is a hydrocarbon radical.

According to a preferred instantiation of the instantiation, the hydrocarbon radical may be an alkyl radical, preferably an alkyl radical having 1 to 12 carbon atoms, more preferably a branched, linear or else cyclic alkyl radical having 1 to 12 carbon atoms, still more preferably 1 to 6 carbon atoms, particularly 1 to 4 carbon atoms, more particularly methyl or ethyl radical(s).

According to a preferred instantiation of the embodiment, in the first rubber composition (FC) and/or the second rubber composition (SC), preferably in the first rubber composition (FC) and the second rubber composition (SC), the first diene elastomer(s) may exhibit a glass transition temperature(s) ($Tg_{DSC}$) of less than −40° C. (for example, between −120° C. and −40° C.), preferably less than −45° C. (for example, between −115° C. and −45° C.).

According to a preferred instantiation of the embodiment, in the third rubber composition (TC), the first diene elastomer(s) may exhibit a glass transition temperature(s) ($Tg_{DSC}$) of more than −40° C. (for example between −40° C. and +40° C.), preferably more than −35° C. (for example between −35 and +35° C.), more preferably more than −30° C. (for example between −30 and +30° C.), still more preferably at least −25° C. (for example −25° C. to +25° C.).

According to a preferred instantiation of the embodiment, in the first rubber composition (FC), the elastomer matrix may comprise 20 to 100 phr, preferably 30 to 100 phr, more preferably 40 to 100 phr, still more preferably 50 to 100 phr, particularly more than 50 phr and up to 100 phr, of the first diene elastomer(s), and comprises no second diene elastomer or comprises at most 80 phr, preferably at most 70 phr, more preferably at most 60 phr, still more preferably at most 50 phr, particularly less than 50 phr, of the second diene elastomer(s).

According to a preferred instantiation of the instantiation, in the first rubber composition (FC), the elastomer matrix may comprise 20 to 90 phr, preferably 30 to 90 phr, more preferably 40 to 90 phr, still more preferably 50 to 90 phr, particularly more than 50 phr and up to 90 phr, of the first diene elastomer(s), and comprises 10 to 80 phr, preferably 10 to 70 phr, more preferably 10 to 60 phr, still more preferably 10 to 50 phr, particularly at least 10 phr and less than 50 phr, of the second diene elastomer(s).

According to a preferred instantiation of the instantiation, in the first rubber composition (FC), the elastomer matrix may comprise 20 to 80 phr, preferably 30 to 80 phr, more preferably 40 to 80 phr, still more preferably 50 to 80 phr, particularly more than 50 phr and up to 80 phr, of the first diene elastomer(s), and comprises 20 to 80 phr, preferably 20 to 70 phr, more preferably 20 to 60 phr, still more preferably 20 to 50 phr, particularly at least 20 phr and less than 50 phr, of the second diene elastomer(s).

According to a preferred instantiation of the instantiation, in the first rubber composition (FC), the elastomer matrix may comprise 30 to 70 phr, preferably 40 to 70 phr, more preferably 50 to 70 phr, still more preferably still more than 50 phr and up to 70 phr, of the first diene elastomer(s), and comprises 30 to 70 phr, preferably 30 to 60 phr, more preferably 30 to 50 phr, still more preferably at least 30 phr and less than 50 phr, of the second diene elastomer(s).

According to a preferred instantiation of the embodiment, in the second rubber composition (SC), the elastomer matrix may comprise 20 to 100 phr, preferably 30 to 100 phr, more preferably 40 to 100 phr, still more preferably 50 to 100 phr, particularly more than 50 phr and up to 100 phr, of the first diene elastomer(s), and comprises no second diene elastomer or comprises at most 80 phr, preferably at most 70 phr, more preferably at most 60 phr, still more preferably at most 50 phr, particularly less than 50 phr, of the second diene elastomer(s).

According to a preferred instantiation of the instantiation, in the second rubber composition (SC), the elastomer matrix may comprise 20 to 90 phr, preferably 30 to 90 phr, more preferably 40 to 90 phr, still more preferably 50 to 90 phr, particularly more than 50 phr and up to 90 phr, of the first diene elastomer(s), and 10 to 80 phr, preferably 10 to 70 phr, more preferably 10 to 60 phr, still more preferably 10 to 50 phr, particularly at least 10 phr and less than 50 phr, of the second diene elastomer(s).

According to a preferred instantiation of the instantiation, in the second rubber composition (SC), the elastomer matrix may comprise 20 to 80 phr, preferably 30 to 80 phr, more preferably 40 to 80 phr, still more preferably 50 to 80 phr, particularly more than 50 phr and up to 80 phr, more particularly 60 to 80 phr, of the first diene elastomer(s), and 20 to 80 phr, preferably 20 to 70 phr, more preferably 20 to 60 phr, still more preferably 20 to 50 phr, particularly at least 20 phr and less than 50 phr, more particularly 20 to 40 phr, of the second diene elastomer(s).

According to a preferred instantiation of the embodiment, in the third rubber composition (TC), the elastomer matrix may comprise more than 50 phr and up to 100 phr, preferably 60 to 100 phr, more preferably 70 to 100 phr, still more preferably 80 to 100 phr, particularly 90 to 100 phr, more particularly 100 phr, of the first diene elastomer(s), and may comprise no second diene elastomer or comprises less than 50 phr, preferably at most 40 phr, more preferably at most 30 phr, still more preferably at most 20 phr, particularly 10 phr, of the second diene elastomer(s).

According to a preferred instantiation of the embodiment, the second diene elastomer(s) may be selected from the group consisting of natural rubber, synthetic polyisoprenes, polybutadienes, butadiene copolymers, isoprene copolymers, and the mixtures thereof.

According to a preferred instantiation of the embodiment, the second diene elastomer(s) may be a polybutadiene(s).

According to a preferred instantiation of the embodiment, the second diene elastomer(s) may be a butadiene copolymer(s), preferably a styrene-butadiene copolymer(s), more preferably a solution styrene-butadiene copolymer(s).

Each of the rubber compositions which are the first rubber composition (FC), the second rubber composition (SC) and the third rubber composition (TC) is based on each reinforcing filler. The reinforcing filler can reinforce each of these rubber compositions, and may comprise a reinforcing organic filler (for example, carbon black), a reinforcing inorganic filler (for instance, silica), or the mixtures thereof.

Use may be made of any type of reinforcing filler known for its capabilities of reinforcing a rubber composition which can be used for the manufacture of tires, for example a reinforcing organic filler, such as carbon black, or a reinforcing inorganic filler, such as silica, with which a coupling agent is combined in a known way.

As carbon blacks, all carbon blacks conventionally used in tires ("tire-grade" blacks) are suitable, such as for example reinforcing carbon blacks of the 100, 200 or 300 series in ASTM grades (such as for example, the N115, N134, N234, N326, N330, N339, N347 or N375 blacks), or carbon blacks higher series, the 500, 600, 700 or 800 series in ASTM grades (such as for example the N550, N660, N683, N772, N774 blacks). The carbon blacks might for example be already incorporated in an elastomer matrix, for instance, a diene elastomer, in the form of a masterbatch (see for example applications WO 97/36724 or WO 99/16600).

The expression "reinforcing inorganic filler" should be understood here to mean any inorganic or mineral filler, whatever its color and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known manner, by the presence of hydroxyl (—OH) groups at its surface.

The physical state under the presence of this filler is unimportant, whether it is in the form of powder, microbeads, granules, beads or any other suitable densified form. Of course, the reinforcing inorganic filler of the mixtures of various reinforcing inorganic fillers, preferably of highly dispersible siliceous and/or aluminous fillers is described hereafter.

Mineral fillers of the siliceous type, preferably silica ($SiO_2$) and/or the aluminous type, preferably alumina ($Al_2O_3$) are suitable in particular as the reinforcing inorganic fillers.

According to a preferred embodiment, in the first rubber composition (FC), the second rubber composition, and/or the third rubber composition (TC), the reinforcing filler predominately comprise the reinforcing inorganic filler, that means the reinforcing filler may comprise more than 50% by weight of the reinforcing inorganic filler per 100% by weight of the total reinforcing filler. More preferably, the content of reinforcing inorganic filler is more than 60% by weight, still more preferably more than 70% by weight, particularly more than 80% by weight, more particularly more than 90% by weight, per 100% by weight of the total reinforcing filler.

The reinforcing inorganic filler may be silica. The silica may be a type of silica or a blend of several silicas. The silica used may be any reinforcing silica known to a person skilled in the art, in particular any precipitated or pyrogenic silica having a BET surface area and a CTAB specific surface area that are both less than 450 m$^2$/g, preferably from 20 to 400 m$^2$/g. Such silica may be covered or not. Mention will be made, as low specific surface silica, of Sidistar R300 from Elkem Silicon Materials. Mention will be made, as highly dispersible precipitated silicas ("HDSs"), for example, of "Ultrasil 7000" and "Ultrasil 7005" from Evonik, "Zeosil 1165 MP", "Zeosil 1135 MP" and "Zeosil 1115 MP" from Rhodia, "Hi-Sil EZ150G" from PPG, "Zeopol 8715", "Zeopol 8745" and "Zeopol 8755" from Huber or the silicas with a high specific surface area as described in a patent application WO 03/016387. Mention will be made, as pyrogenic silicas, for example, of "CAB-O-SIL S-17D" from Cabot, "HDK T40" from Wacker, "Aeroperl 300/30", "Aerosil 380", "Aerosil 150" or "Aerosil 90" from Evonik. Such silica may be covered, for example, "CAB-O-SIL TS-530" covered with hexamethyldiasilazene or "CAB-O-SIL TS-622" covered with dimethyldichlorosilane from Cabot.

According to a preferred embodiment of the invention, in case of that the reinforcing filler may comprise the reinforcing inorganic filler, particularly in case of that it is silica, may have a BET surface area and a CTAB specific surface area that are advantageously 50 to 350 m$^2$/g, more advantageously 100 to 300 m$^2$/g, still more preferably between 150 and 250 m$^2$/g.

The BET surface area is measured according to a known method, that is, by gas adsorption using the Brunauer-Emmett-Teller method described in "The Journal of the American Chemical Society", Vol. 60, page 309, February 1938, and more specifically, in accordance with the French standard NF ISO 9277 of December 1996 (multipoint volumetric method (5 points); where gas: nitrogen, degassing: 1 hour at 160° C., relative pressure range p/po: 0.05 to 0.17). The CTAB specific surface area is determined according to the French standard NF T 45-007 of November 1987 (method B).

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made of carbon blacks for tires, such as described in patent applications WO 96/37547 and WO 99/28380.

According to a preferred embodiment of the invention, the first rubber composition (FC) may comprise between 50 and 200 phr, preferably between 60 and 200 phr, more preferably between 70 and 200 phr, still more preferably between 80 and 200 phr, particularly between 90 and 190 phr, more particularly between 100 and 180 phr, still more particularly between 110 and 170 phr, of the reinforcing filler. The reinforcing filler may comprise advantageously between 80 and 200 phr, more advantageously between 90 and 190 phr, still more advantageously between 100 and 180 phr, especially 110 to 170 phr, of a reinforcing inorganic filler (for example, silica).

According to a preferred embodiment of the invention, in the second rubber composition (SC), the reinforcing filler may comprise 20 to 200 phr, preferably 20 to 180 phr, more preferably 20 to 160 phr, still more preferably 20 to 140 phr, particularly 20 to 120 phr, more particularly 20 to 100 phr, still more particularly 20 to 90 phr, advantageously 40 to 90 phr, more advantageously 60 to 90 phr, of a reinforcing inorganic filler (for instance, silica).

According to a preferred embodiment of the invention, in the third rubber composition (TC), the reinforcing filler may comprise more than 60 phr (for example, between 60 and 200 phr), preferably more than 70 phr (for example, between 70 and 180 phr), more preferably more than 80 phr (for example, between 80 and 160 phr), still more preferably more than 90 phr (for example, between 90 and 150 phr), particularly more than 100 phr (for example, between 100 and 140 phr), more particularly more than 110 phr (for example, between 110 and 130 phr), still more preferably at last 115 phr (for example, 115 to 125 phr), of a reinforcing inorganic filler (for instance, silica).

According to a preferred embodiment of the invention, in the first rubber composition (FC) and/or the second rubber composition (SC), preferably in the first rubber composition (FC) and the second rubber composition (SC), the reinforcing filler may further comprise less than 40 phr (for example, between 0.5 and 40 phr), preferably less than 30 phr (for example, between 1 and 30 phr), more preferably less than 20 phr (for example, between 1.5 and 20 phr), still more preferably less than 10 phr (for example, between 2 and 10 phr), of carbon black.

According to a preferred embodiment of the invention, in the third rubber composition (TC), the reinforcing filler may comprise no carbon black or less than 40 phr, preferably less than 30 phr, more preferably less than 20 phr, still more preferably less than 10 phr, particularly less than 5 phr, more particularly at most 3 phr, of carbon black.

Within each of the aforementioned ranges of content of carbon black in the rubber compositions (the first, the second and the third rubber compositions), there is a benefit of coloring properties (black pigmentation agent) and anti-UV properties of carbon blacks, without furthermore adversely affecting the typical performance provided by the reinforcing inorganic filler, namely high grip on snowy ground and/or low hysteresis loss.

In order to couple the reinforcing inorganic filler to the diene elastomer, use can be made, in a known manner, of a coupling agent (or bonding agent) intended to provide a satisfactory connection, of chemical and/or physical nature, between the reinforcing inorganic filler (surface of its particles) and the diene elastomer. This coupling agent is at least bifunctional. Use can be made in particular of at least bifunctional organosilanes or polyorganosiloxanes.

Use can be made in particular of silane polysulphides, referred to as "symmetrical" or "asymmetrical" depending on their particular structure, as described, for example, in applications WO 03/002648, WO 03/002649 and WO 2004/033548.

Particularly suitable silane polysulphides correspond to the following general formula (I):

$$Z\text{-}Z\text{-}S_x\text{-}A\text{-}Z, \quad (I)$$

in which:
  x is an integer from 2 to 8 (preferably from 2 to 5);
  A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);

Z corresponds to one of the formulae below:

[Chem. 1]

in which:
  the $R^1$ radicals which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
  the $R^2$ radicals which are unsubstituted or substituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably a group selected from $C_1$-$C_4$ alkoxyls, in particular methoxyl and ethoxyl), are suitable in particular, without limitation of the above definition.

In the case of a mixture of alkoxysilane polysulphides corresponding to the above formula (I), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(3-triethoxysilylpropyl)disulphide, abbreviated to TESPD, of formula $[(C_2HSO)_3 Si(CH_2)_3S]_2$. Mention will also be made, as preferred examples, of bis(mono($C_1$-$C_4$) alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, as described in patent application WO 02/083782 (or U.S. Pat. No. 7,217,751).

Mention will in particular be made, as coupling agent other than alkoxysilane poly-sulphide, of bifunctional POSs (polyorganosiloxanes) or of hydroxysilane poly-sulphides ($R^2$=OH in the above formula (I)), such as described in patent applications WO 02/30939 (or U.S. Pat. No. 6,774,255) and WO 02/31041 (or US 2004/051210), or of silanes or POSs carrying azodicarbonyl functional groups, such as described, for example, in patent applications WO 2006/125532, WO 2006/125533 and WO 2006/125534.

As examples of other silane sulphides, mention will be made, for example, of the silanes bearing at least one thiol (—SH) function (referred to as mercaptosilanes) and/or at least one blocked thiol function, such as described, for example, in patents or patent applications U.S. Pat. No. 6,849,754, WO 99/09036, WO 2006/023815, WO 2007/098080, WO 2008/055986 and WO 2010/072685.

Of course, use could also be made of mixtures of the coupling agents described previously, as described in particular in the aforementioned patent application WO 2006/125534.

According to one preferred embodiment of the invention, in the first rubber composition (FC), the second rubber composition (SC) and/or the third rubber composition (TC), the content of coupling agent may be from 0.5 to 15% by weight per 100% by weight of the reinforcing inorganic filler, particularly silica.

According to one preferred embodiment of the invention, in the first rubber composition (FC), the second rubber composition (SC) and/or the third rubber composition (TC), the content of coupling agent may be less than 30 phr (for example, between 0.1 and 30 phr), preferably less than 25 phr (for example, between 0.5 and 25 phr), more preferably less than 20 phr (for example, between 1 and 20 phr), still more preferably less than 15 phr (for example, between 1.5 and 15 phr).

Each of the rubber compositions which are the first rubber composition (FC), the second rubber composition (SC) and the third rubber composition (TC) is based on each plasticizing agent. The plasticizing agent may comprise a liquid plasticizer(s), a hydrocarbon resin(s) or the mixtures thereof.

The role of liquid plasticizer is to soften the matrix by diluting the elastomer and the reinforcing filler.

Any extending oil, whether of aromatic or non-aromatic nature, any liquid plasticizing agent known for its plasticizing properties with regard to elastomer matrix(es) (for instance, diene elastomer), can be used as the liquid plasticizer. At ambient temperature (20° C.) under atmospheric pressure, these plasticizers or these oils, which are more or less viscous, are liquids (that is to say, as a reminder, substances that have the ability to eventually take on the shape of their container), as opposite to plasticizing hydrocarbon resin(s) which are by nature solid at ambient temperature (20° C.) under atmospheric pressure.

While, in a manner known to a person skilled in the art, the designation "resin" is reserved in the present application, by definition, for a compound which is solid at ambient temperature (20° C. under atmosphere pressure), in contrast to a liquid plasticizing compound, such as an oil.

The hydrocarbon resin(s) are polymer well known by a person skilled in the art, which are essentially based on carbon and hydrogen, and thus miscible by nature in rubber composition(s), for instance, diene elastomer composition(s). They can be aliphatic or aromatic or also of the aliphatic/aromatic type, that is to say based on aliphatic and/or aromatic monomers. They can be natural or synthetic and may or may not be petroleum-based (if such is the case, also known under the name of petroleum resins). They are preferably exclusively hydrocarbon, that is to say, that they comprise only carbon and hydrogen atoms.

Preferably, the hydrocarbon resin(s) as being "plasticizing" exhibits at least one, more preferably all, of the following characteristics:

a $Tg_{DSC}$ of above 20° C.(for example, between 20° C. and 100° C.), preferably above 30° C. (for example, between 30° C. and 100° C.), more preferably above 40° C. (for example, between 40° C. and 100° C.);

a number-average molecular weight (Mn) of between 400 and 2000 g/mol (more preferably between 500 and 1500 g/mol);

a polydispersity index (PI) of less than 3, more preferably less than 2 (reminder: PI=Mw/Mn with Mw the weight-average molecular weight).

The macrostructure (Mw, Mn and PI) of the hydrocarbon resin(s) is determined by steric exclusion chromatography (SEC): solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 "Waters" columns in series ("Styragel" HR4E, HR1 and HR0.5); detection by differential refractometer ("Waters 2410") and its associated operating software ("Waters Empower").

Preferably, the hydrocarbon resin(s) may be selected from the group consisting of cyclopentadiene (abbreviated to CPD) homopolymer or copolymer resins, dicyclopentadiene (abbreviated to DCPD) homopolymer or copolymer resins, terpene homopolymer or copolymer resins, $C_5$ fraction homopolymer or copolymer resins, $C_9$ fraction homopolymer or copolymer resins, alpha-methyl styrene homopolymer or copolymer resins and the mixtures thereof. Use is more preferably made, among the above copolymer resins, of those selected from the group consisting of (D)CPD/vinylaromatic copolymer resins, (D)CPD/terpene copolymer resins, (D)CPD/$C_5$ fraction copolymer resins, (D)CPD/$C_9$ fraction copolymer resins, terpene/vinylaromatic copolymer resins, terpene/phenol copolymer resins, $C_5$ fraction/vinyl-aromatic copolymer resins, $C_9$ fraction/vinylaromatic copolymer resins, and the mixtures thereof.

The term "terpene" combines here, in a known way, the α-pinene, β-pinene and limonene monomers; use is preferably made of a limonene monomer, which compound exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Styrene, α-methylstyrene, ortho-, meta- or para-methylstyrene, vinyltoluene, para-(tert-butyl)styrene, methoxystyrenes, chlorostyrenes, hydroxystyrenes vinylmesitylene, divinylbenzene, vinylnaphthalene, or any vinylaromatic monomer resulting from a $C_9$ fraction (or more generally from a $C_8$ to $C_{10}$ fraction) are suitable, for example, as vinylaromatic monomer. Preferably, the vinylaromatic compound is styrene or a vinylaromatic monomer resulting from a $C_9$ fraction (or more generally from a $C_8$ to $C_{10}$ fraction). Preferably, the vinylaromatic compound is the minor monomer, expressed as molar fraction, in the copolymer under consideration.

The preferred resins above are well known to a person skilled in the art and are commercially available, for example:

polylimonene resins: by DRT under the name "Dercolyte L120" (Mn=625 g/mol; Mw=1010 g/mol; PI=1.6; $Tg_{DSC}$=72° C.) or by Arizona Chemical Company under the name "Sylvagum TR7125C" (Mn=630 g/mol; Mw=950 g/mol; PI=1.5; $Tg_{DSC}$=70° C.);

$C_5$ fraction/vinylaromatic, notably $C_5$ fraction/styrene or $C_5$ fraction/$C_9$ fraction, copolymer resins: by Neville Chemical Company under the names "Super Nevtac 78", "Super Nevtac 85" or "Super Nevtac 99", by Goodyear Chemicals under the name "Wingtack Extra", by Kolon under the names "Hikorez T1095" and "Hikorez T1100", or by Exxon under the names "Escorez 2101" and "ECR 373";

limonene/styrene copolymer resins: by DRT under the name "Dercolyte TS 105" or by Arizona Chemical Company under the names "ZT115LT" and "ZT5100".

Mention may also be made, as examples of other preferred resins, of phenol-modified α-methylstirene resins. It should be remembered that, in order to characterize these phenol-modified resins, use is made, in a known way, of a number referred to as "hydroxyl number" (measured according to Standard ISO 4326 and expressed in mg KOH/g). α-Methylstirene resins, in particular those modified with phenol, are well known to a person skilled in the art and are available commercially, for example sold by Arizona Chemical Company under the names "Sylvares SA 100"

(Mn=660 g/mol; PI=1.5; $Tg_{DSC}$=53° C.); "Sylvares SA 120" (Mn=1030 g/mol; PI=1.9; $Tg_{DSC}$=64° C.); "Sylvares 540" (Mn=620 g/mol; PI=1.3; $Tg_{DSC}$=36° C.; hydroxyl number=56 mg KOH/g); and "Sylvares 600" (Mn=850 g/mol; PI=1.4; $Tg_{DSC}$=50° C.; hydroxyl number=31 mg KOH/g).

According to a preferred embodiment of the invention, the first rubber composition (FC) may be based on more than 30 phr, preferably more than 40 phr, more preferably more than 50 phr, still more preferably more than 60 phr, of the plasticizing agent.

According to a preferred embodiment of the invention, in the first rubber composition (FC), the plasticizing agent may comprise no liquid plasticizer(s) or may comprise at most 100 phr, preferably at most 90 phr, more preferably at most 80 phr, still more preferably at most 70 phr, particularly at most 60 phr, more particularly from 10 to 60 phr, of a liquid plasticizer(s).

According to a preferred embodiment of the invention, in the first rubber composition (FC), the plasticizing agent may comprise a liquid plasticizer(s) selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof, preferably selected from the group consisting of MES oils, TDAE oils, naphthenic oils, vegetable oils and the mixtures thereof, more preferably selected from the group consisting of MES oils, vegetable oils and the mixtures thereof, still more preferably selected from the group consisting of vegetable oils and the mixtures thereof. The vegetable oil(s) may be made of an oil selected from the group consisting of linseed, safflower, soybean, corn, cottonseed, turnip seed, castor, tung, pine, sunflower, palm, olive, coconut, groundnut and grapeseed oils, and the mixtures thereof, particularly sunflower oil(s), more particularly sunflower oil(s) containing over 60%, still more particularly over 70%, advantageously over 80%, more advantageously over 90%, still more advantageously 100%, by weight of oleic acid.

According to a preferred embodiment of the invention, in the first rubber composition (FC), the plasticizing agent may comprise 5 to 100 phr, preferably 5 to 90 phr, more preferably 5 to 80 phr, still more preferably 5 to 70 phr, particularly 10 to 60 phr, of a hydrocarbon resin(s) exhibiting a glass transition temperature(s) ($Tg_{DSC}$) of more than 20° C. (for example, between 20° C. and 100° C.), preferably more than 30° C. (for example, between 30° C. and 100° C.), more preferably more than 40° C. (for example, between 40° C. and 100° C.).

In the second rubber composition (SC), the plasticizing agent comprises 5 to 100 phr of a liquid plasticizer(s) exhibiting a glass transition temperature(s) ($Tg_{DSC}$) of less than −70° C. (for example, between −140° C. and −70° C.).

The glass transition temperature(s) which liquid plasticizer(s) exhibits are suitable for grip performance on the tire running at air temperature of at most 0° C. Regarding the content of the liquid plasticizer, below the indicated minimum, the targeted technical effect is insufficient. Wherein the indicated maximum, there is an issue of cost of the liquid plasticizer and a risk of worsening processability.

According to a preferred embodiment of the invention, in the second rubber composition (SC), the plasticizing agent comprises 10 to 90 phr, preferably 15 to 80 phr, more preferably 20 to 70 phr, still more preferably 30 to 60 phr, particularly 40 to 60 phr, of the liquid plasticizer(s) exhibiting the glass transition temperature(s) ($Tg_{DSC}$) of less than −70° C.

According to a preferred embodiment of the invention, in the second rubber composition (SC), the liquid plasticizer(s) may exhibit the glass transition temperature(s) ($Tg_{DSC}$) of less than −80° C. (for example, between −130° C. and −80° C.), preferably less than −90° C. (for example, between −120° C. and −90° C.), more preferably less than −100° C. (for example, between −110° C. and −100° C.).

According to a preferred embodiment of the invention, in the second rubber composition (SC), the liquid plasticizer(s) exhibiting the glass transition temperature(s) ($Tg_{DSC}$ of less than −70° C. may be selected from the group consisting of liquid phosphate plasticizer(s) and the mixtures thereof.

According to a preferred instantiation of the embodiment, in the second rubber composition (SC), the liquid phosphate plasticizer(s) may have between 12 and 30 carbon atoms in total, preferably the liquid phosphate plasticizer(s) may be trialkyl phosphate having between 12 and 30 carbon atoms in total.

The number of carbon atoms of trialkyl phosphate should be taken to mean the total number of carbon atoms of three alkyl groups. The three alkyl groups of trialkyl phosphate may be the same or different each other. The term "alkyl" used herein refers to a straight or branched alkyl group, which may contain a hetero atom such as an oxygen atom in its chain, or which may be substituted with a halogen atom such as fluorine, chlorine, bromine or iodine. The trialkyl phosphate may have one or two phenyl groups of instead of alkyl groups.

Mention may be made, as examples of the trialkyl phosphate, of an oil selected from the group consisting of tris(2-butoxyethyl) phosphate ($C_{18}H_{39}O_7P$), 2-ethylhexyl diphenyl phosphate ($C_{20}H_{27}O_4P$), trioctyl phosphate (especially, tris(2-ethylhexyl) phosphate) ($C_{24}H_{51}O_4P$) and the mixtures thereof.

According to a preferred instantiation of the embodiment, in the second rubber composition (SC), the liquid phosphate plasticizer(s) may be tris(2-ethylhexyl) phosphate.

The liquid phosphate plasticizer is commercially available; for example, product name: Disflmoll TOF ($Tg_{DSC}$=−105° C.) provided by Lanxess co., ltd.

According to a preferred instantiation of the embodiment, in the second rubber composition (SC), the plasticizing agent may comprise no liquid plasticizer other than the liquid phosphate plasticizer or comprises at most 50 phr, preferably at most 40 phr, more preferably at most 30 phr, still more preferably at most 20 phr, particularly at most 10 phr, of a liquid plasticizer(s) other than the liquid phosphate plasticizer(s).

According to a preferred instantiation of the instantiation, in the second rubber composition (SC), the liquid plasticizer other than the liquid phosphate plasticizer may be selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers other than phosphate plasticizers, sulphonate plasticizers and the mixtures thereof.

According to a preferred embodiment of the invention, in the second rubber composition (SC), the plasticizing agent may comprise no hydrocarbon resin or may comprise at most 50 phr, preferably at most 40 phr, more preferably at most 30 phr, still more preferably at most 20 phr, particularly at most 10 phr, of a hydrocarbon resin(s) exhibiting a glass transition temperature(s) ($Tg_{DSC}$) of more than 20° C. (for example, between 20° C. and 100° C.), preferably more than 30° C. (for example, between 30° C. and 100° C.), more preferably more than 40° C. (for example, between 40° C. and 100° C.).

According to a preferred embodiment of the invention, in the third rubber composition (TC), the plasticizing agent may comprise no liquid plasticizer or comprise at most 90 phr, preferably 10 to 80 phr, more preferably 20 to 70 phr, still more preferably 30 to 60 phr, particularly 40 to 50 phr, of a liquid plasticizer(s), preferably exhibiting a glass transition temperature(s) ($Tg_{DSC}$) of less than −20° C. (for example, between −70° C. and −20° C.), more preferably less than −30° C. (for example, between −70° C. and −30° C.), still more preferably more preferably less than −40° C. (for example, between −70° C. and −40° C.), particularly still more preferably more preferably less than −50° C.(for example, between −70° C. and −50° C.).

According to a preferred embodiment of the invention, in the third rubber composition (TC), the plasticizing agent may comprises a liquid plasticizer(s) selected from the group consisting of liquid diene polymers, polyolefinic oils, naphthenic oils, paraffinic oils, Distillate Aromatic Extracts (DAE) oils, Medium Extracted Solvates (MES) oils, Treated Distillate Aromatic Extracts (TDAE) oils, Residual Aromatic Extracts (RAE) oils, Treated Residual Aromatic Extracts (TRAE) oils, Safety Residual Aromatic Extracts (SRAE) oils, mineral oils, vegetable oils, ether plasticizers, ester plasticizers, phosphate plasticizers, sulphonate plasticizers and the mixtures thereof.

The third rubber composition (TC) is based on a plasticizing agent comprising 5 to 100 phr of a hydrocarbon resin(s) exhibiting a glass transition temperature(s) ($Tg_{DSC}$) of more than 20° C.

According to a preferred embodiment of the invention, in the third rubber composition (TC), the plasticizing agent may comprise 10 to 90 phr, preferably 15 to 80 phr, more preferably 20 to 70 phr, of the hydrocarbon resin(s) exhibiting the glass transition temperature(s) ($Tg_{DSC}$) of more than 20° C.

According to a preferred embodiment of the invention, in the third rubber composition (TC), the hydrocarbon resin(s) exhibiting the glass transition temperature(s) ($Tg_{DSC}$) of more than 30° C. (for example, between 30° C. and 100° C.), preferably more than 40° C. (for example, between 40° C. and 100° C.), more preferably more than 45° C. (for example, between 45° C. and 100° C.), still more preferably at least 50° C. (for example, at least 50° C. and less than 100° C.).

The rubber compositions (the first, the second and the third rubber compositions) of the treads of the tires according to the invention may be based on all or a portion(s) of the usual additives generally used in the elastomer compositions intended for the manufacture of treads for tires, in particular for snow tires or winter tires, such as, for example, protection agents, such as antiozone waxes, chemical antiozonants, antioxidants, reinforcing resins, methylene acceptors (for example phenolic novolak resin) or methylene donors (for example HMT or H3M hexamethylenetetramine (HMT) or hexamethoxymethylmelamine (H3M)), a crosslinking system based either on sulphur or on donors of sulphur and/or per oxide and/or bismaleimides, vulcanization accelerators, or vulcanization activators.

These compositions can be also based on coupling activators when a coupling agent is used, agents for covering the reinforcing inorganic filler or more generally processing aids capable, in a known way, by virtue of an improvement in the dispersion of the filler in the rubber matrix and of a lowering of the viscosity of the compositions, of improving their property of processing in the raw state; these agents are, for example, hydrolysable silanes, such as alkylalkoxysilanes, polyols, polyethers, amines, or hydroxylated or hydrolysable polyorganosiloxanes.

The dynamic shear modulus G* owned by each of the rubber compositions which are the first rubber composition (FC), the second rubber composition (SC) and the third rubber composition (TC) means complex modulus G* defined as being the absolute value of a complex sum of elastic modulus G' and viscous modulus G":

$$G^* = \sqrt{G'^2 + G''^2}$$ [Math.1]

The elastic modulus (G') and the viscous modulus (G") denote dynamic properties well known to a person skilled in the art. These properties are measured on a Metravib VA4000 type viscoanalyzer on test specimens molded from unvulcanized compositions. Test specimens such as those described in the standard ASTM D 5992-96 (the version published in September 2006, initially approved in 1996), Figure X2.1 (circular embodiment) are used. The diameter "d" of the test specimen is 10 mm (so it therefore has a circular cross section of 78.5 mm$^2$), the thickness "L" of each of the portions of rubber composition is 2 mm, which gives a "d/L" ratio of 5 (unlike in the ISO to standard 2856 mentioned in the ASTM standard at paragraph X2.4 which recommends a d/L value of 2). The response of a test specimen of vulcanized rubber composition subjected to simple alternating sinusoidal shear stresses at a frequency of 10 Hz is recorded. The test specimen is shear loaded sinusoidally at 10 Hz, with an imposed stress (0.70 or 0.25 MPa), symmetrically about its equilibrium position. The test specimen undergoes an accommodation cycle prior to measurement. The test specimen is then shear loaded sinusoidally at 10 Hz, at 100% deformation peak-peak, at an ambient temperature. The measurements are taken as the temperature increases at a gradient of 1.5° C. per minute, from a temperature $T_{min}$ below a glass transition temperature (Tg) of the material, up to a temperature $T_{max}$ which may correspond to the rubber plateau of the material. The glass transition temperature (Tg) is a temperature measured on the maximum of a ratio (G'/G") which is tan delta. The glass transition temperature (Tg) can be obtained with the measurement of the above modulus (G' and G"). Before the temperature sweep from $T_{min}$ to $T_{max}$ is begun, the test specimen is stabilized at the temperature $T_{min}$ for 20 minutes in order to have a uniform temperature within the test specimen. The result exploited is the dynamic shear modulus of elasticity (G') and the viscous shear modulus (G") at selected temperatures.

According to a preferred embodiment of the invention, the glass transition temperature of the first rubber composition (FC) on the maximum tan δ when subjected to an alternating maximum stress of 0.70 MPa at a frequency of 10 Hz may be higher than that of the second rubber composition (SC), and may be lower than that of the third rubber composition (TC). The difference of glass transition temperatures among the rubber compositions may generate a preferred difference of rigidities among the rubber compositions, which may lead a high grip performance on snowy ground.

According to a preferred instantiation of the embodiment, the glass transition temperature of the second rubber composition (SC) on the maximum tan δ when subjected to an alternating maximum stress of 0.70 MPa at a frequency of 10 Hz may be less than −40° C. (for example, between −100° C. and −40° C., preferably between −90° C. and −40° C.), and wherein the glass transition temperature of the third rubber composition (TC) on the maximum tan δ when subjected to an alternating maximum stress of 0.70 MPa at a frequency of 10 Hz may be more than −10° C. (for example, between −10° C. and 30° C.), preferably more than 0° C. (for example, between 0° C. and 20° C.).

According to a preferred embodiment of the invention, the dynamic share modulus G* of the first rubber composition (FC) when subjected to the alternating maximum stress of 0.25 MPa at the frequency of 10 Hz and a temperature of −10° C. may be higher than that of the second rubber composition (SC), and may be lower that of the third rubber composition (TC). The difference of glass transition temperatures among the rubber compositions may generate a preferred difference of rigidities among the rubber compositions, which may lead a high grip performance on snowy ground.

According to a preferred instantiation of the embodiment, the dynamic share modulus G* of the second rubber composition (SC) when subjected to the alternating maximum stress of 0.25 MPa at the frequency of 10 Hz and a temperature of −10° C. may be less than 2.0 MPa, preferably less than 1.8 MPa.

According to a preferred instantiation of the embodiment, the difference of dynamic share modulus G* between the first rubber composition (FC) and the second rubber composition (SC) when subjected to an alternating maximum stress of 0.25 MPa at a frequency of 10 Hz and a temperature of −10° C. may be at least 1.0 MPa, preferably at least 1.5 MPa, more preferably at least 2.0 MPa, still more preferably at least to 2.5 MPa.

According to a preferred instantiation of the instantiation, the dynamic share modulus G* of the first rubber composition (FC) when subjected to the alternating maximum stress of 0.25 MPa at the frequency of 10 Hz and a temperature of −10° C. may be at least 3.0 MPa, preferably at least 3.5 MPa, more preferably at least 4.0 MPa.

According to a preferred embodiment of the invention, the dynamic share modulus

G* of the third rubber composition (TC) when subjected to the alternating maximum stress of 0.25 MPa at the frequency of 10 Hz and a temperature of −10° C. may be more than 100 MPa, more preferably more than 300 MPa, still more preferably more than 400 MPa, particularly more than 500 MPa, more particularly more than 600 MPa. Such high share modulus G* of the third rubber composition may lead a high grip performance on snowy ground.

Each of the rubber compositions which are the first rubber composition (FC), the second rubber composition (SC) and and the third rubber compositions (TC) of the treads of the tires according to the invention may be manufactured in appropriate mixers using two successive preparation phases well known to a person skilled in the art: a first phase of thermomechanical working or kneading (referred to as "non-productive" phase) at high temperature, up to a maximum temperature of between 110° C. and 190° C., preferably between 130° C. and 180° C., followed by a second phase of mechanical working (referred to as "productive" phase) at a lower temperature, typically of less than 110° C., for example between 40° C. and 100° C., finishing phase during which the crosslinking or vulcanization system is incorporated.

A process which can be used for the manufacture of each of such compositions comprises, for example and preferably, the following steps:

incorporating in the elastomer matrix(es), for instance, the diene elastomer(s), in a mixer, the reinforcing filler, the plasticizing agent, during a first stage ("non productive" stage) everything being kneaded thermomechanically (for example in one or more steps) until a maximum temperature of between 110° C. and 190° C. is reached;

cooling the combined mixture to a temperature of less than 100° C.;

subsequently incorporating, during a second stage (referred to as a "productive" stage), a crosslinking system;

kneading everything up to a maximum temperature of less than 110° C.;

extruding or calendering the rubber composition thus obtained, in particular in the form of a tire tread.

By way of example, the first (non-productive) phase is carried out in a single thermo-mechanical stage during which all the necessary constituents are introduced into an appropriate mixer, such as a standard internal mixer, followed, in a second step, for example after kneading for 1 to 2 minutes, by the other additives, optional additional filler-covering agents or processing aids, with the exception of the crosslinking system. The total kneading time, in this non-productive phase, is preferably between 1 and 15 min.

After cooling the mixture thus obtained, the crosslinking system is then incorporated at low temperature (for example, between 40° C. and 100° C.), generally in an external mixer, such as an open mill; the combined mixture is then mixed (the second (productive) phase) for a few minutes, for example between 2 and 15 min.

The crosslinking system is preferably based on sulphur and on a primary vulcanization accelerator, in particular on an accelerator of sulphenamide type. Added to this vulcanization system are various known secondary accelerators or vulcanization activators, such as zinc oxide, stearic acid, guanidine derivatives (in particular diphenylguanidine), and the like, incorporated during the first non-productive phase and/or during the productive phase. The content of sulphur is preferably between 0.5 and 10.0 phr, and that of the primary accelerator is preferably between 0.5 and 5.0 phr.

Use may be made, as accelerator (primary or secondary) of any compound capable of acting as accelerator of the vulcanization of elastomer matrix(es), for instance, diene elastomer(s), in the presence of sulphur, in particular accelerators of the thiazoles type and their derivatives, accelerators of thiurams types, or zinc dithiocarbamates. These accelerators are more preferably selected from the group consisting of 2-mercaptobenzothiazyl disulphide (abbreviated to "MBTS"), N-cyclohexyl-2-benzothiazole sulphenamide (abbreviated to "CBS"), N,N-dicyclohexyl-2 benzothiazolesulphenamide ("DCBS"), N-tert-butyl-2-benzothiazolesulphenamide ("TBBS"), N-tert-butyl-2 benzothiazolesulphenimide ("TBSI"), zinc dibenzyldithiocarbamate ("ZBEC"), Tetrabenzylthiuram disulfide ("TBZTD") and the mixtures thereof.

Each of the final compositions thus obtained is subsequently calendered, for example in the form of a sheet or of a plaque, in particular for laboratory characterization, or else extruded in the form of a rubber profiled element which can be used directly as each portion of snow tire tread or winter tire tread.

As for making the tire according to the invention, it is possible to build a first layer of a homogeneous rubber composition, as the first rubber composition (FC), and a second layer of another homogeneous rubber composition, as the second rubber composition (SC), then superpose the first layer onto the second layer or sandwich the other layer(s) or portion(s) between the first layer and the second layer to get a raw tread band, and then build and mold a tire. The first layer forming the external portion is radially outer located to the internal portion. Preferably, the first layer is located to be intended to come into contact with the ground in the new state of the tire. The second layer forming the internal portion is radially inner located to the external portion. Preferably, the second layer is adjacent to the external portion.

According to a preferred embodiment of the invention, the radially internal portion made of the second rubber composition (SC) is adjacent to the radially external portion made of the first rubber composition (FC).

Moreover, a step in a manufacture of the tread of the tire according to the invention is to cover the first rubber composition (FC) with the layer of the third rubber composition (TC).

For example, the step can be done with a method described in the aforementioned application WO 2013/087878, namely by impregnating a two-dimensional fiber assembly such a fabric or non-woven, or a three-dimensional fiber assembly as a felt, previously placed in the appropriate dimensions, with the third rubber composition (TC). This impregnation can be done for example by hot calendering, by press molding or by injection under pressure.

The presence of the fiber assembly impregnated with the third rubber composition (TC), allows to obtain an excellent cohesion of the layer of the third rubber composition (TC) before vulcanization of the tire and thus assist the layer of the third rubber composition (TC) to place on the first rubber composition (FC) during molding of the tire.

Of course, means other than the fiber assembly could be used to improve the cohesion and the placement of the layer of the third rubber composition (TC) in the raw state, such as a rigid metal sheet, cellulose fiber (for instance, paper, cardboard) or another polymer.

Of course, if such a fiber assembly, strip or other means, is used to help the laying of the third rubber composition (TC) to place on the first rubber composition (FC) during the manufacture of the tire according to the invention, the third rubber composition (TC) can comprise the fiber assembly, the strip or the other means unless the fiber assembly, the strip or the other means is extracted before the curing of the tire.

Preferably, the fibers used are long fibers having a longest dimension of greater than 30 mm, more preferably of greater than 50 mm.

Any type of fibers, preferably fibers selected from the group consisting of textile fiber, mineral fiber and the mixtures thereof, can be used to the layer of the third rubber composition (TC) with sufficient tensile rigidity to facilitate the placement of layer of the third rubber composition (TC) during molding of the tire.

The textile fiber may be selected from the group consisting of natural origin fibers, synthetic fibers and the mixtures thereof. The natural origin fibers may be made an organic material selected from the group consisting of silk, cotton, bamboo, cellulose, wool and the mixtures thereof, preferably cotton, cellulose, wood and the mixtures thereof. The synthetic fibers may be made of a synthetic material selected from the group consisting of polyester, polyamide, carbon, aramid, polyethylene, polypropylene, polyacrylonitrile, polyimide, polysulfone, polyether sulfone, polyurethane, polyvinyl alcohol and the mixtures thereof.

The mineral fiber may be selected from the group consisting of glass fibers, basalt fiber and the mixtures thereof.

Then, one way of obtaining such a tread pattern is for example to cover the entirety of a green form of a tread comprising the first rubber composition (FC) with the layer of the third rubber composition (TC) of suitable thickness before molding the tread and the cut-outs (3, 4). After molding, the third rubber composition (TC) on the contact surface (2) can be left in place or alternatively eliminated by a mechanical means (notably by grinding).

Another way of industrially producing a tread of a tire according to the invention may consist in applying, to the unvulcanized green form of the tire provided with a tread made of the first rubber composition (FC), thin strips of the third rubber composition (TC), as described in patent EP 0510550 (it is possible for the thin strips to be applied to the tread in the circumferential, axial direction(s) and/or along an angle(s)). Another way may consist in producing the tread by coextruding two (or more) compounds when the tread is extruded. It is still possible to operate as described in FIGS. 5-6 and paragraph IV-B of WO2013/087878.

After vulcanization of the tire of the invention, the specific layer of the third rubber composition (TC) described above has the advantage of providing a very high stiffness at a low temperature (at most 0° C.) to the edges (23, 24, 25, 26) formed by the intersection of the contact surfaces (2) and the high rigidity lateral faces (13, 14, 15, 16), which is particularly favorable behavior of the tire on snowy ground.

The invention is further illustrated by the following non-limiting examples.

Examples

Three compositions (identified as C-1, C-2 and C-3) based on a diene elastomer
(SBR bearing a SiOR function) reinforced with a silica (as an reinforcing inorganic filler) or a blend of the silica and carbon black with a varying plasticizing agent comprising a liquid plasticizer or a mixture of a liquid plasticizer and a hydrocarbon resin were prepared. The formulations of three compositions are given at Table 1 with the content of the various products expressed in phr, and the dynamic properties measured on the Metravib VA4000 type viscoanalyzer in accordance with ASTM D5992-96 under arbitrary suitable conditions are given in Table 2.

Each rubber composition was produced as follows: The reinforcing filler, its associated coupling agent, the plasticizing agent, the elastomer matrix and the various other ingredients, with the exception of the vulcanization system, were successively introduced into an internal mixer having an initial vessel temperature of approximately 60° C.; the mixer was thus approximately 70% full (% by volume). Thermomechanical working (non-productive phase) was then carried out in one stage, which lasts in total approximately 3 to 4 minutes, until a maximum "dropping" temperature of 165° C. was reached. The mixture thus obtained was recovered and cooled and then sulphur and an accelerator of sulphenamide type were incorporated on an external mixer (homofinisher) at 20 to 30° C., everything being mixed (productive phase) for an appropriate time (for example, between 5 and 12 min).

The rubber compositions thus obtained were subsequently calendered, either in the form of sheets (thickness of 2 to 3 mm) or of fine sheets of rubber, for the measurement of their physical or mechanical properties, or in the form of profiled elements which could be used directly, after cutting and/or assembling to the desired dimensions, for example as tire semi-finished products, in particular as tire treads.

Furthermore, five test specimens (T-0, T-1 (comparative examples), T-2 (a reference), T-3 (an example according to the invention), and T-4 (a comparative example)) having external and internal portions produced by superposition of the sheets made of the rubber compositions (C-1, C-2 and C-3) as the first rubber composition (FC) and the second rubber composition (SC), and the external portions covered with layers made of the rubber compositions (C-1, C-2 and C-3) as the third rubber composition (TC) are compared. The properties of the five specimens T-0 to T-4, obtained from friction coefficient measurements under arbitrary suitable conditions (snowy ground, normal stress, sliding velocity and temperature) are given in Table 3, a value greater than that of the reference composition T-2, arbitrarily set at 100, indicating an improved result, i.e. an aptitude for a shorter braking distance.

Figure 3:
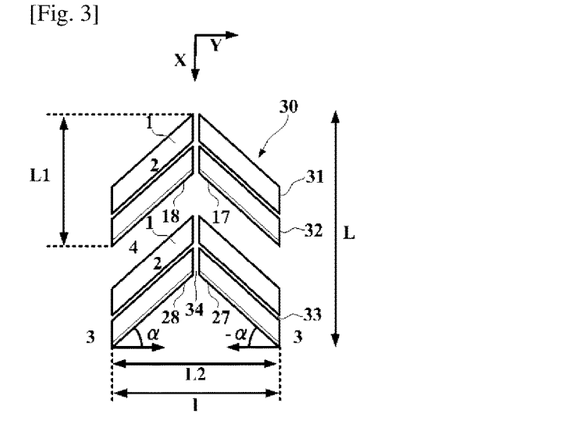
FIG. 3 shows a plan view of a test specimen (30) for a dynamic friction co-efficient measurement on snow.
Figure 4:
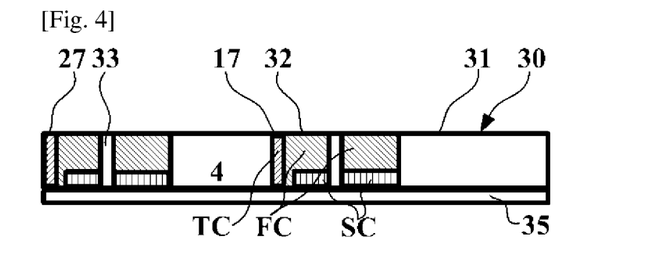
FIG. 4 shows the test specimen of FIG. 3, in side view.

T-0: FC: C-1, SC: C-1, TC: C-1 (a comparative example);
T-1: FC: C-2, SC: C-2, TC: C-2 (a comparative example);
T-2: FC: C-1, SC: C-1, TC: C-3 (a reference);
T-3: FC: C-1, SC: C-2, TC: C-3 (an example according to the invention);
T-4: FC: C-1, SC: C-3, TC: C-2 (a comparative example);

Each test specimen (30) used is shown in the appended FIGS. 3 (view from above) and 4 (view from the side). X is a sliding direction which is a longitudinal direction, and Y is a transversal direction which is perpendicular to the longitudinal direction. Each test specimen (30) comprises two chevron shape blocks (31) which have a length (L1: 40.7 mm) in the longitudinal direction, a width (L2: 51.0 mm) in the transversal direction, and a height (7.6 mm) in a normal direction which is perpendicular to the longitudinal and the transversal directions. Each block (31) is delimited grooves (3, 4). The groove (4) extending along an angle(s) ($\pm\alpha$: $\pm 50°$) from the transversal direction has a width of 10.5 mm in the longitudinal direction. Each block (31) comprises four portions (32) intervally delimited by a sipe (33) extending along the angle(s) ($\pm\alpha$) from the transversal direction and another sipe (34) longitudinally extending. Each sipe (33, 34) is open to both sides of each block (31), and the sipe (33) has a 0.5 mm of a width in the longitudinal direction, and the other sipe (34) has a 1.0 mm of a width in the transversal direction. The grooves (3, 4) and the sipes (33, 34) have a depth (H: 7.6 mm). Each test specimen (30) comprises the blocks (31) which comprise the internal portion made of second rubber composition (SC) and the external portion made of first rubber composition (FC) covered with layers made of the third rubber composition on lateral faces (17, 18) that have an orientation that extends the angle(s) ($\pm\alpha$). The layers applied to the first rubber composition (FC) as described in patent EP 050550 have a thickness (E1: 0.6 mm) in a direction perpendicular to the lateral face(s) (17, 18) and a height ($H_{TC}$: 7.6 mm) in the normal direction. The height ($H_{SC}$) from the contact surface (2) to the outermost of the internal portion of made of the second rubber composition (SC) is 6.1 mm. Each test specimen (30) was produced by molding, then crosslinking of a rectangular rubbery support (34) which has a length (L: 70.9 mm) in the longitudinal direction, a width (l: 51.0 mm) in the transversal direction, and a thickness (2 mm) in the normal direction. After closing the mold, the latter was placed in a press with heated platens at a temperature (typically 160° C.), and for the time that was necessary for the crosslinking of these rubber compositions (typically several tens of minutes), at a pressure of 16 bar.

The friction coefficient measurements on snow were carried out based on each of the test specimens sliding at a given condition (a displacement: 0 to 0.03 m, a speed: 0 to 0.5 m/s, and an acceleration: 5 m/s$^2$) over a hard pack snow track, set at about −10° C. with a CTI penetrometer reading of about 90 in accordance with Standard ASTM F1805, with an imposed normal stress (about 300 kPa). The forces generated in a direction of travel (Fx) of each of the test specimens and in another direction perpendicular to the travel (Fz) were measured. The Fx/Fz ratio determines the friction co-efficient of each of the test specimens on the snow. This test, the principle of which is well known to a person skilled in the art (see, for example, an article entitled "Investigation of rubber friction on snow for tires" written by Sam Ella, Pierre-Yves Formagne, Vasileios Koutsos and Jane R. Blackford (38th LEEDS-Lyons Symposium on tribology, Lyons, 6-9 Sep. 2011)) makes it possible to evaluate, under representative conditions, the grip on snow which would be obtained after a running test on a vehicle fitted with tires whose tread is composed of the same rubber compositions.

The results from Table 3 demonstrate that the test specimen T-3 according to the invention have certainly higher values of the grip performance on snow than that of the other test specimens T-0, T-1, T-2 and T-4 (the reference, the comparative examples).

In conclusion, the rubber compositions of the tread of the tire according to the invention make possible an improvement of grip on snowy ground.

TABLE 1

| | Rubber composition(s) | | |
| --- | --- | --- | --- |
| | C-1 | C-2 | C-3 |
| BR (1) | 40 | 30 | |
| SBR1 (2) | 60 | | |
| SBR2 (3) | | 70 | |
| SBR3 (4) | | | 100 |
| Carbon black (5) | 4 | 5 | |
| Silica (6) | 115 | 80 | 120 |
| Coupling agent (7) | 9.2 | 6.4 | 9.6 |
| Liquid plasticizer 1 (8) | 40 | | |
| Liquid plasticizer 2 (9) | | 50 | |
| Liquid plasticizer 3 (10) | | | 45 |
| Hydrocarbon resin 1 (11) | 30 | | |
| Hydrocarbon resin 2 (12) | | | 25 |
| ZnO | 1.4 | 1.3 | 2.5 |
| Stearic acid | 3 | 1 | 1 |
| Antiozone wax | 1.9 | 1.5 | 1.5 |
| Antioxidant (13) | 2.7 | 2.0 | 2.0 |
| DPG (14) | 2.1 | 1.9 | 3.0 |
| Sulphur | 1.4 | 2.0 | 2.0 |
| Accelerator (15) | 1.6 | 1.7 | 1.7 |

(1) BR: BR with 0.3% of 1,2 vinyl; 2.7% of trans; 97% of cis-1,4 ($Tg_{DSC}$=−105° C.);

(2) SBR1: solution SBR with 27% of styrene unit and 24% of unit 1,2 of the butadiene part ($Tg_{DSC}$=−48° C.) bearing a SiOR function, R being a hydrogen atom, the SiOR being dimethylsilanol function at the end of the elastomer chain, the SBR prepared according to a process described in a patent EP 0 778 311 B1;

(3) SBR2: solution SBR with 27% of styrene unit and 24% of unit 1,2 of the butadiene part ($Tg_{DSC}$=−48° C.) bearing a SiOR function, R being a methyl radical, the SiOR function not located at the ends of the elastomer chain;

wherein the silicon atom of the SiOR function is inserted between the carbon-carbon bonds of the elastomer chain; the SBR further bearing a tertiary amine function made of the amine substituted with two methyl radicals; wherein the nitrogen atom of the amine function is not inserted between the carbon-carbon of the elastomer chain, and the SiOR function bears the amine function; the SBR prepared according to a process described in a patent EP 2 285 852 B1;

(4) SBR3: solution SBR with 44% of styrene unit and 41% of unit 1,2 of the butadiene part ($Tg_{DSC}$=−12° C.) bearing a SiOR function, R being a hydrogen atom, the SiOR being dimethylsilanol function at the end of the elastomer chain, the SBR prepared according to a process described in a patent EP 0 778 311 B1;

(5) Carbon black: Carbon black (ASTM grade N234 from Cabot);

(6) Silica: Silica ("Zeosil 1165MP" from Rhodia (CTAB, BET: about 160 m²/g));

(7) Coupling agent TESPT ("Si69" from Evonik);

(8) Oleic sunflower oil ("Agripure 80" from Cargill, Weight percent oleic acid: 100%);

(9) Tris(2-ethylhexyl)phosphate ("Disflamoll TOF" from Lanxess, $Tg_{DSC}$=−105° C.);

(10) TDAE oil ("Vivatec 500" from the Hansen & Rosenthal company);

(11) Hydrocarbon resin $C_5/C_9$ type ("Escorez ECR-373" from Exxon, $Tg_{DSC}$=44° C.).

(12) Cycloaliphatic hydrocarbon resins (ESCOREZ5600, Exxon mobil, $Tg_{DSC}$=52° C.);

(13) N-(1,3-dimethylbutyl)-N-phenyl-para-phenylenediamine ("Santoflex 6-PPD" from Flexsys);

(14) Diphenylguanidine ("Perkacit DPG" from Flexsys);

(15) N-dicyclohexyl-2-benzothiazolesulphenamide ("Santocure CBS" from Flexsys).

TABLE 2

|  | Rubber composition(s) | | |
| --- | --- | --- | --- |
|  | C-1 | C-2 | C-3 |
| Tg [° C.] (16) | −27 | −55 | 8 |
| G*(−10° C., 0.25 MPa, 10 Hz) [MPa] (17) | 4.0 | 1.5 | 678 |

(16) Glass transition temperature on the maximum tanδ when subjected to an alternating maximum stress of 0.70 MPa at a frequency of 10 Hz, measured on the Metravib VA4000 type viscoanalyzer in accordance with ASTM D5992-96.

(17) Dynamic shear modulus G* when subjected to an alternating maximum stress of 0.25 MPa, at a frequency of 10 Hz and at a temperature of −10° C., measured on the Metravib VA4000 type viscoanalyzer in accordance with ASTM D5992-96.

TABLE 3

|  | Test specimen(s) | | | | |
| --- | --- | --- | --- | --- | --- |
|  | T-0 | T-1 | T-2 | T-3 | T-4 |
| First rubber composition (FC) | C-1 | C-2 | C-1 | C-1 | C-1 |
| Second rubber composition (SC) | C-1 | C-2 | C-1 | C-2 | C-3 |
| Third rubber composition (TC) | C-1 | C-2 | C-3 | C-3 | C-2 |
| Snow μ laboratory | 85 | 100 | 100 | 120 | 85 |

The invention claimed is:

1. A tire having a tread comprising at least two radially superposed portions which comprise a radially external portion being made of a first rubber composition, and a radially internal portion being made of a second rubber composition which is different from the first rubber composition, the tread comprising a plurality of tread pattern elements delimited by cut-outs, the tread pattern elements respectively comprising at least one lateral face and a contact surface intended to come into contact with the ground during rolling, and the external portion of the tread pattern elements being at least partially covered on at least one of the lateral face with a layer of a third rubber composition which is different from the first rubber composition and the second rubber composition, wherein the first rubber composition is based on at least:
an elastomer matrix;
a reinforcing filler; and
a plasticizing agent;

wherein the second rubber composition is based on at least:
an elastomer matrix;
a reinforcing filler; and
a plasticizing agent comprising 5 to 100 phr of a liquid plasticizer exhibiting a glass transition temperature of less than −70° C., wherein the liquid plasticizer is a liquid phosphate plasticizer or the liquid plasticizer is the liquid phosphate plasticizer and at most 50 phr of a liquid plasticizer other than the liquid phosphate plasticizer; and wherein the third rubber composition is based on at least:
an elastomer matrix;
a reinforcing filler; and
a plasticizing agent comprising 5 to 100 phr of a hydrocarbon resin exhibiting a glass transition temperature of more than 20° C.;

wherein the glass transition temperature of the first rubber composition (FC) on a maximum tan δ when subjected to an alternating maximum stress of 0.70 MPa at a frequency of 10 Hz is higher than that of the second rubber composition (SC) and is lower than that of the third rubber composition (TC).

2. The tire according to claim 1, wherein the first rubber composition is based on the elastomer matrix comprising more than 50 phr and up to 100 phr of a first diene elastomer selected from the group consisting of natural rubber, synthetic polyisoprenes, polybutadienes, butadiene copolymers, isoprene copolymers and mixtures thereof and comprising from 0 to less than 50 phr of a second diene elastomer, between 50 and 200 phr of the reinforcing filler, and more than 30 phr of the plasticizing agent.

3. The tire according to claim 1, wherein the elastomer matrix of the second rubber composition comprises more than 50 phr and up to 100 phr of a first diene elastomer exhibiting a glass transition temperature of less than −40° C. and from 0 to less than 50 phr of a second diene elastomer.

4. The tire according to claim 1, wherein the elastomer matrix of the second rubber composition comprises 20 to 100 phr of a first diene elastomer bearing at least one SiOR function, R being a hydrogen atom or a hydrocarbon radical, and comprises from 0 to at most 80 phr of a second diene elastomer.

5. The tire according to claim 4, wherein the first diene elastomer of the elastomeric matrix of the second rubber composition exhibits a glass transition temperature of less than −40° C.

6. The tire according to claim 1, wherein the reinforcing filler of the second rubber composition comprises 20 to 200 phr of an inorganic filler.

7. The tire according to claim 1, wherein the reinforcing filler of the second rubber composition comprises less than 40 phr of carbon black.

8. The tire according to claim 1, wherein, in the first rubber composition and the second rubber composition, the reinforcing filler comprises less than 40 phr of carbon black.

9. The tire according to claim 1, wherein, in the second rubber composition, the plasticizing agent comprises 0 to at most 50 phr of a hydrocarbon resin exhibiting a glass transition temperature of more than 20° C.

10. The tire according to claim 9, wherein, in the second rubber composition, the plasticizing agent comprises 0 to at most 20 phr of a hydrocarbon resin exhibiting a glass transition temperature of more than 20° C.

11. The tire according to claim 10, wherein, in the second rubber composition, the plasticizing agent comprises 0 to at most 10 phr of a hydrocarbon resin exhibiting a glass transition temperature of more than 20° C.

12. The tire according to claim 1, wherein the elastomer matrix of the third rubber composition comprises more than 50 phr and up to 100 phr of a first diene elastomer exhibiting a glass transition temperature of more than −40° C. and comprises 0 to less than 50 phr of a second diene elastomer.

13. The tire according to claim 1, wherein the reinforcing filler of the third rubber composition comprises more than 60 phr of a reinforcing inorganic filler.

14. The tire according to claim 1, wherein, in the third rubber composition, the reinforcing filler comprises 0 to less than 40 phr of carbon black.

15. The tire according to claim 1, wherein, in the third rubber composition, the plasticizing agent comprises 0 to at most 90 phr of a liquid plasticizer exhibiting a glass transition temperature of between −70° C. and −20° C.

16. The tire according to claim 1, wherein the plasticizing agent of the third rubber composition comprises 10 to 90 phr of the hydrocarbon resin.

17. The tire according to claim 16, wherein, in the third rubber composition, the plasticizing agent comprises 15 to 80 phr of the hydrocarbon resin.

18. The tire according to claim 17, wherein, in the third rubber composition, the plasticizing agent comprises 20 to 70 phr of the hydrocarbon resin.

19. The tire according to claim 1, wherein, in the first rubber composition, the second rubber composition, and the third rubber composition, the elastomer matrix comprises more than 50 phr and up to 100 phr of a first diene elastomer and from 0 to less than 50 phr of a second diene elastomer which is different from the first diene elastomer, wherein, in the first rubber composition and the second rubber composition, the first diene elastomer exhibits a glass transition temperature of less than −40° C., and wherein, in the third rubber composition, the first diene elastomer exhibits a glass transition temperature of more than −40° C.

20. The tire according to claim 1, wherein the tire is a snow tire.

* * * * *